(12) United States Patent
Takenaka

(10) Patent No.: US 11,494,135 B2
(45) Date of Patent: Nov. 8, 2022

(54) INFORMATION PROCESSING APPARATUS, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Shuichi Takenaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/342,135

(22) Filed: Jun. 8, 2021

(65) Prior Publication Data
US 2021/0405937 A1 Dec. 30, 2021

(30) Foreign Application Priority Data

Jun. 29, 2020 (JP) .............................. JP2020-111848
Feb. 10, 2021 (JP) .............................. JP2021-020062

(51) Int. Cl.
*G06F 3/12* (2006.01)
(52) U.S. Cl.
CPC .......... *G06F 3/1208* (2013.01); *G06F 3/1206* (2013.01); *G06F 3/1242* (2013.01); *G06F 3/1248* (2013.01); *G06F 3/1256* (2013.01); *G06F 3/1287* (2013.01)

(58) Field of Classification Search
CPC ..... G06F 3/1248; G06F 3/1232; G06F 3/1247
See application file for complete search history.

(56) References Cited

U.S. PATENT DOCUMENTS

2009/0296150 A1* 12/2009 Shudo ................... H04N 1/4426
358/1.15
2016/0231970 A1* 8/2016 Tabuki ................... G06F 3/1287

FOREIGN PATENT DOCUMENTS

JP 2019-185549 A 10/2019

\* cited by examiner

*Primary Examiner* — Benjamin O Dulaney
(74) *Attorney, Agent, or Firm* — Canon U.S.A., Inc. IP Division

(57) ABSTRACT

An information processing apparatus includes one or more processors configured to perform operations including receiving information indicating a predetermined object from an image forming apparatus, determining whether the object indicated by the information is included in image data for which a printing instruction has been issued by a user, designating a format of the image data, to be transmitted to the image forming apparatus, based on a result of the determining, converting the image data into the designated format, and transmitting the converted image data to the image forming apparatus.

15 Claims, 21 Drawing Sheets

FIG.12A

| Printer Name | Parameter for Determining Processing Load (Threshold Value) | Object Type High in Load (Threshold Value) |
|---|---|---|
| Printer A | Number of Occurrences of Overlapping of Objects (10) | ICCBased Object with Transparency Attribute (5) |
| Printer B | Number of Occurrences of Overlapping of Objects (5) | Transparent Object, ICCBased Object (10) |
| Printer C | Number of Objects (15) | ICCBased Object with Transparency Attribute (5) |

FIG.12B

| Printer Name | Blank Page Skip | Object-Dependent Image Processing | Edge Enhancement |
|---|---|---|---|
| Printer A | Disabled State | Disabled State | Disabled State |
| Printer B | Disabled State | Disabled State | Enabled state |
| Printer C | Enabled state | Enabled state | Disabled State |

FIG.15A

| Printer Name | Renderer Algorithm | PDF Interpreter Algorithm |
|---|---|---|
| Printer A | Scanline | DirectPDF |
| Printer B | Scanline | PDFtoPS |
| Printer C | Painter's | DirectPDF |

FIG.15B

| Renderer Algorithm | Parameter for Determining Processing Load (Threshold Value) |
|---|---|
| Scanline | Number of Occurrences of Overlapping of Objects (10) |
| Painter's | Number of Objects (15) |

FIG.15C

| PDF Interpreter Algorithm | Object Type High in Load (Threshold Value) |
|---|---|
| DirectPDF | ICCBased Object Having Transparency Attribute (5) |
| PDFtoPS | Transparent or ICCBased Object (10) |

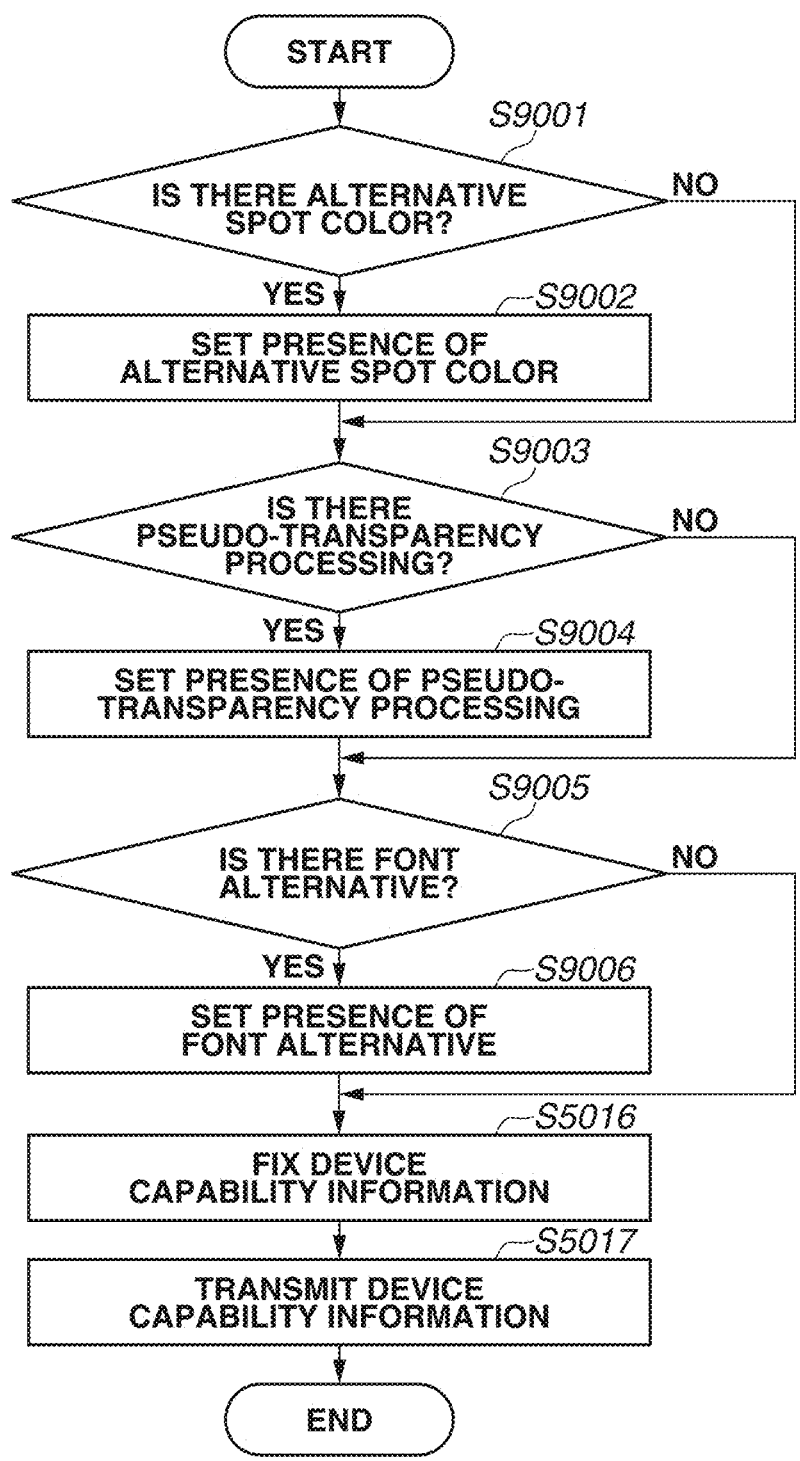

FIG.19

| Printer Name | Alternative Processing |
|---|---|
| Printer A | Font Alternative (Font A), Pseudo-Transparency Processing, Alternative Spot Color |
| Printer B | Font Alternative, Alternative Spot Color |
| Printer C | Pseudo-Transparency Processing, Alternative Spot Color |

INFORMATION PROCESSING APPARATUS, CONTROL METHOD FOR INFORMATION PROCESSING APPARATUS, AND STORAGE MEDIUM

BACKGROUND

Field of the Disclosure

Aspects of the present disclosure generally relate to an information processing apparatus, a control method for an information processing apparatus, a storage medium.

Description of the Related Art

In the case of transmitting print data from a client terminal, such as a mobile terminal, to an image forming apparatus and causing the image forming apparatus to interpret the print data to perform printing, the client terminal is required to transmit print data of the format which the image forming apparatus is able to interpret. Therefore, the client terminal acquires capability information indicating image data of which format the image forming apparatus is able to interpret, generates data of the format that is based on the acquired capability information, and transmits the generated data to the image forming apparatus. For example, in a case where the image forming apparatus is unable to interpret data of the Portable Document Format (PDF) format, the client terminal performs rendering processing to generate data of the raster data format and transmits the generated data of the raster data format to the image forming apparatus. On the other hand, in a case where the image forming apparatus is able to interpret data of PDF format, the client terminal generates data of the PDF format, transmits the generated data of the PDF format to the image forming apparatus, and causes the image forming apparatus to perform rendering processing, as discussed in Japanese Patent Application Laid-Open No. 2019-185549.

Depending on a rendering method or a data interpretation method which the image forming apparatus is able to perform, it may take a long time for the image forming apparatus to perform interpretation or rendering processing, including specific drawing processing, of data transmitted from the client terminal. Moreover, depending on a type of processing, the image forming apparatus may perform alternative processing and thus output an image which differs from an image intended by the client terminal.

SUMMARY

According to embodiments of the present disclosure, an information processing apparatus includes one or more processors configured to perform operations including receiving information indicating a predetermined object from an image forming apparatus, determining whether the object indicated by the information is included in image data for which a printing instruction has been issued by a user, designating a format of the image data, to be transmitted to the image forming apparatus, based on a result of the determining, converting the image data into the designated format, and transmitting the converted image data to the image forming apparatus.

Further features of the present disclosure will become apparent from the following description of exemplary embodiments with reference to the attached drawings.

BRIEF DESCRIPTION OF THE DRAWINGS

FIGS. 12A and 12B are diagrams illustrating device capability information tables which the client terminal manages in the first exemplary embodiment.

FIGS. 15A, 15B, and 15C are diagrams illustrating device capability information tables which the client terminal manages in the second exemplary embodiment.

FIG. 18 is a flowchart illustrating device capability calculation processing which the image forming apparatus performs in the fourth exemplary embodiment.

FIG. 19 is a diagram illustrating a device capability information table which the client terminal manages in the fourth exemplary embodiment.

DESCRIPTION OF THE EMBODIMENTS

Figure 1:
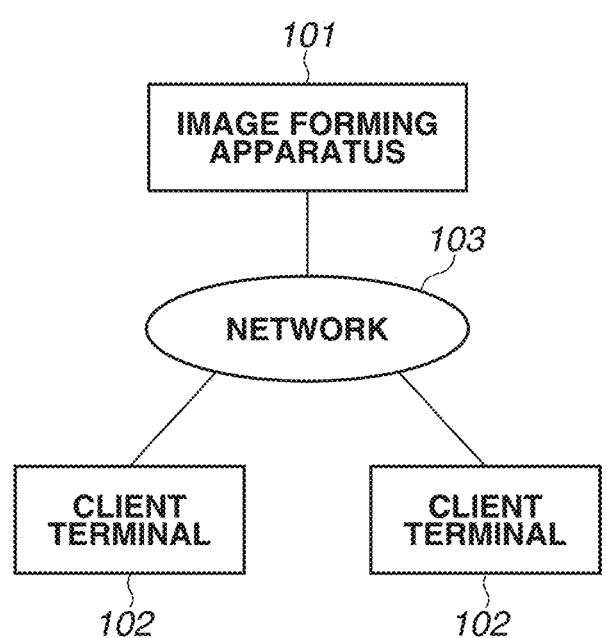
FIG. 1 is a diagram illustrating an example of a configuration of a system in a first exemplary embodiment.

Various exemplary embodiments, features, and aspects of the disclosure will be described in detail below with reference to the drawings.

A printing system in a first exemplary embodiment of the present disclosure previously defines the processing capability of an image forming apparatus, which serves as an inputting destination for a print job, as a processing allowance attribute within a controller included in the image forming apparatus and internally retains the processing allowance attribute in the image forming apparatus. When the image forming apparatus is referred to by a client terminal to transmit a print job thereto, the client terminal acquires the processing allowance attribute from the image forming apparatus and refers to the acquired processing allowance attribute when transmitting a print job to the image forming apparatus.

The client terminal estimates a drawing processing cost of the image forming apparatus required when print data has been input thereto as a print job in the Portable Document Format (PDF) format, by referring to the processing allowance attribute acquired from the image forming apparatus. The processing allowance attribute includes, stored therein, information required to estimate the drawing processing cost. In the first exemplary embodiment, object layout information, which makes a processing load of rendering processing larger, and object type information, which makes a processing load of interpretation processing larger, are stored in the processing allowance attribute. Details of a drawing processing cost estimation method are described below with reference to FIG. 9. As a result of estimating a drawing processing cost, in a case where, if a print job is executed in the PDF format, processing for drawing falls behind a printing speed, the client terminal performs switching control between data formats in such a way as to generate a print job in the raster format.

Additionally, even in a case where it is estimated that the case of executing a print job in the raster format is smaller in processing load, depending on a print setting to be applied to the print job, the client terminal employs the PDF format to generate a print job. For example, in a case where a print setting such as blank page skip, object-type-dependent processing, or edge enhancement is applied to data of the raster format, image processing in the raster format becomes larger in processing load than image processing in the PDF format. In such a case, the client terminal generates a print job not in the raster format but in the PDF format and transmits the print job in the PDF format to the image forming apparatus.

<System Configuration Diagram>

An example of a configuration of the system in the first exemplary embodiment is described with reference to FIG. 1. The system according to the first exemplary embodiment includes an image forming apparatus 101 and a plurality of client terminals 102. The image forming apparatus 101 is connected to the plurality of client terminals 102 via a network 103.

The image forming apparatus 101 is a multifunction peripheral including various functions such as scanning, facsimile (FAX), printing, and copying or a printer including only a printing function.

The client terminal 102 is an information processing apparatus, such as a personal computer (PC), a mobile phone, a personal digital assistance (PDA), a multifunctional mobile phone (hereinafter referred to as a "smartphone"), or a tablet, which the user carries. The client terminal 102 transmits print data to the image forming apparatus 101 via the network 103.

The network 103 is a wireless or wired network configured with a wide area network (WAN) or a local area network (LAN).

<Hardware Block Diagram of Image Forming Apparatus>

Figure 2:
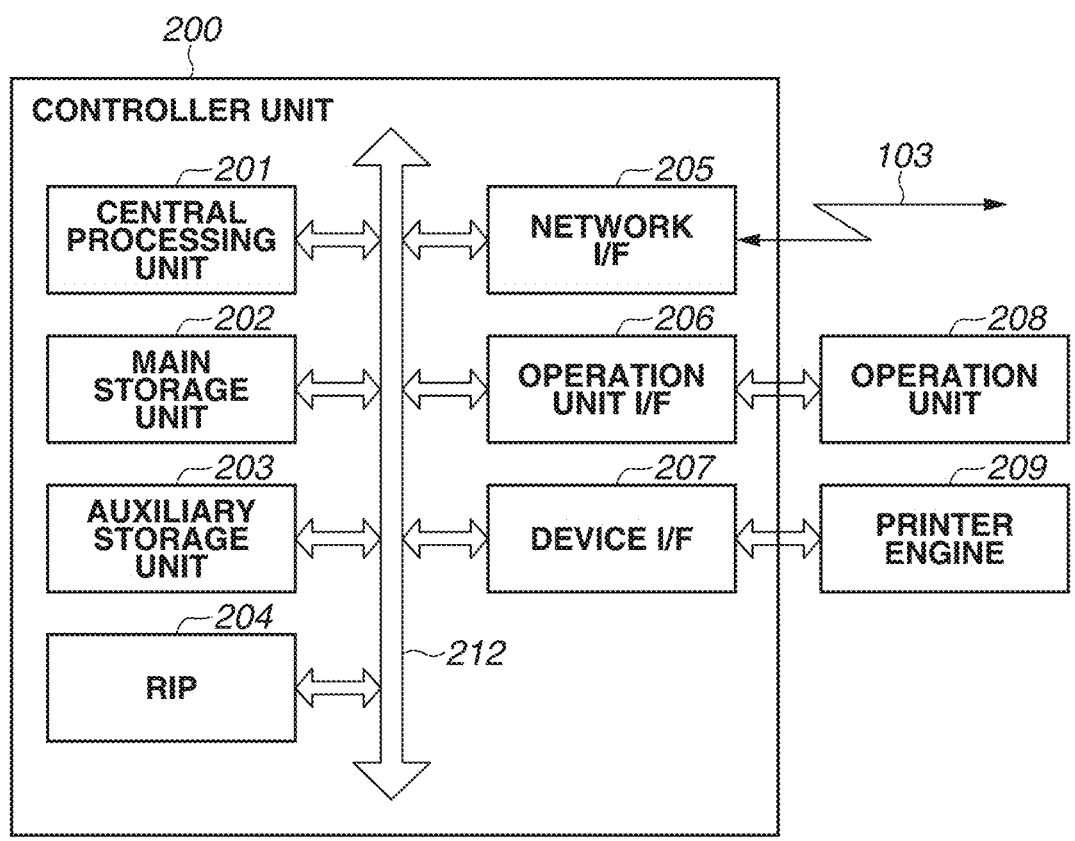
FIG. 2 is a diagram illustrating an example of hardware blocks of an image forming apparatus in the first exemplary embodiment.

FIG. 2 is a hardware block diagram illustrating a configuration of the image forming apparatus 101 in the first exemplary embodiment. Referring to FIG. 2, a controller unit 200 controls inputting and outputting of an image signal and device information.

A central processing unit (CPU) 201 reads out a program stored in an auxiliary storage unit 203, loads the program onto a main storage unit 202, and executes the program. Furthermore, the central processing unit 201 is configured with one more processors. The central processing unit 201 comprehensively controls units or devices connected to a system bus 212.

The main storage unit 202 functions as a main memory or work memory for the central processing unit 201.

The auxiliary storage unit 203 is also used to store large volumes of data on a temporary basis or long-term basis.

A raster image processor (RIP) 204 is a software module or dedicated hardware for rasterizing intermediate print data into a raster image. The RIP 204 is able to process, at high speed, intermediate print data generated on the main storage unit 202 by the central processing unit 201.

A network interface (I/F) 205 is connected to the network 103 and is used to perform inputting and outputting of print data and device information with respect to the outside of the image forming apparatus 101.

An operation unit I/F 206 is an interface unit for an operation unit 208 and outputs, to the operation unit 208, image data to be displayed on the operation unit 208. Moreover, the operation unit I/F 206 communicates, to the central processing unit 201, information input by the user of the image forming apparatus 101 via the operation unit 208.

A device I/F 207 performs transmission of an image signal, transmission of device operation instructions, and reception of device information based on instructions from the central processing unit 201. The controller unit 200 is connected to a printer engine 209 via the device I/F 207.

The operation unit 208 includes, as output devices, a liquid crystal panel and a sound source and includes, as input devices, a touch panel, hardware keys, and a microphone.

The printer engine 209 is a module which outputs an image signal output from the controller unit 200 onto a medium. In the present specification, a method which is used by the printer engine 209 to form an image can be any one of the electrophotographic method and the inkjet method.

<Hardware Block Diagram of Client Terminal>

Figure 3:
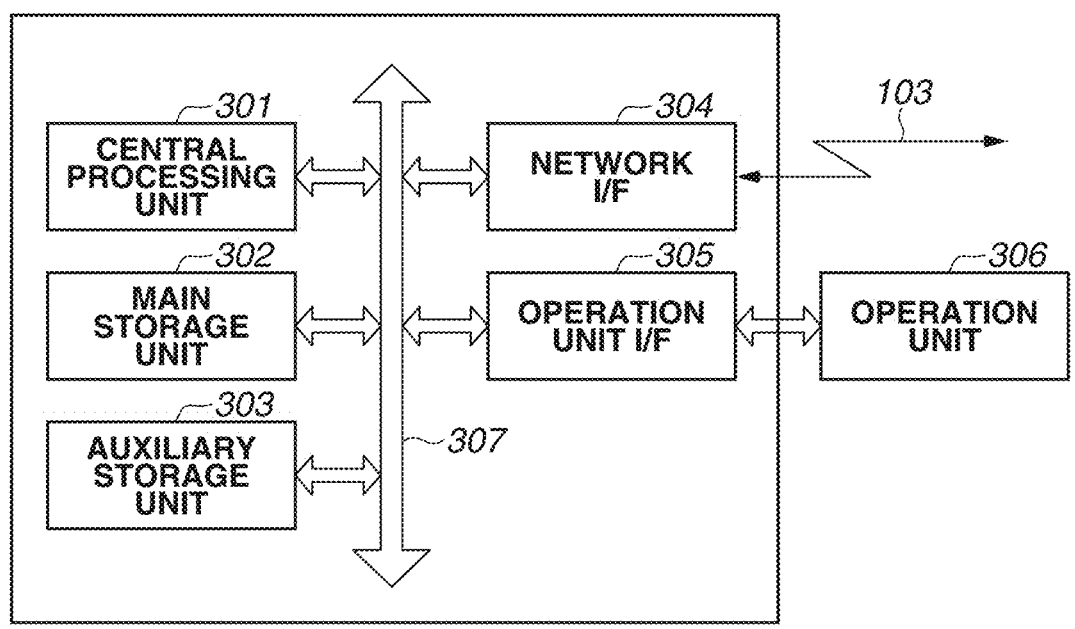
FIG. 3 is a diagram illustrating an example of hardware blocks of a client terminal in the first exemplary embodiment.

FIG. 3 is a hardware block diagram illustrating a configuration of the client terminal 102 in the first exemplary embodiment.

A central processing unit (CPU) 301 reads out a program stored in an auxiliary storage unit 303, loads the program onto a main storage unit 302, and executes the program. Furthermore, the central processing unit 301 is configured with one more processors. Additionally, the central processing unit 301 comprehensively controls units or devices connected to a system bus 307.

The main storage unit 302 functions as a main memory or work memory for the central processing unit 301.

The auxiliary storage unit 303 stores therein an operating system (OS) and various control program bodies. Since the auxiliary storage unit 303 is also used to store large volumes of data on a temporary basis or long-term basis, a print document to be transmitted to the image forming apparatus 101 is stored in a region of the auxiliary storage unit 303.

A network I/F 304 is connected to the network 103 and is used to connect the client terminal 102 to an external information terminal via a wired or wireless network.

An operation unit I/F 305 is an interface unit for an operation unit 306 and outputs, to the operation unit 306, image data to be displayed on the operation unit 306. Moreover, the operation unit I/F 305 communicates, to the central processing unit 301, information input by the user of the client terminal 102 via the operation unit 306.

The operation unit 306 includes, as output devices, a liquid crystal panel and a sound source and includes, as input devices, a touch panel, hardware keys, and a microphone.

To the system bus 307, in addition to the above-mentioned modules, for example, a disk drive for a portable disk recording medium, such as a compact disc (CD) or a digital versatile disc (DVD), or a memory reader-writer for a portable non-volatile recording medium, such as a flash memory or a microSD card, can be connected.

<Software Module Diagram of Image Forming Apparatus>

Figure 4:
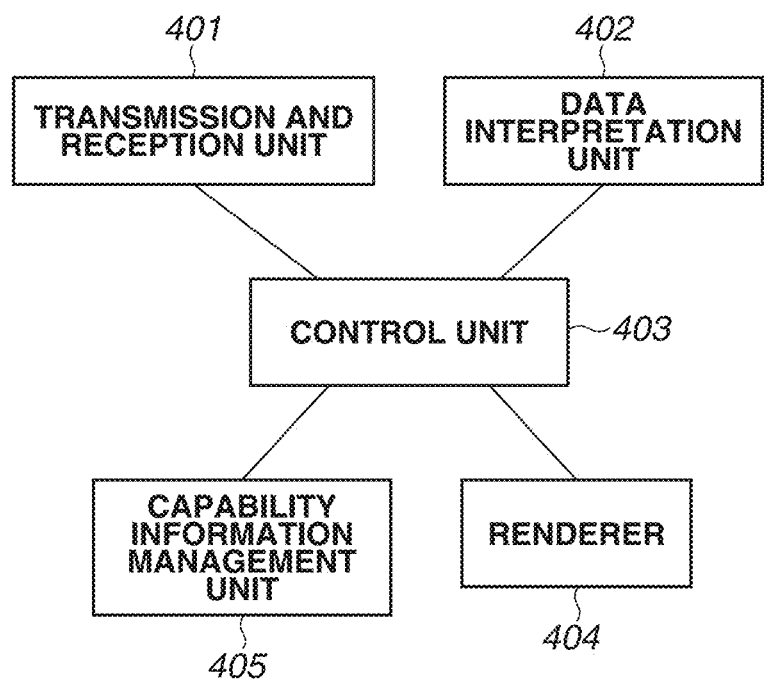
FIG. 4 is a diagram illustrating an example of software modules of the image forming apparatus in the first exemplary embodiment.

FIG. 4 is a diagram illustrating an example of a configuration of software modules of the image forming apparatus 101 in the first exemplary embodiment. The software modules illustrated in FIG. 4 are stored as a program in the auxiliary storage unit 203, are loaded onto the main storage unit 202, and are executed by the central processing unit 201.

A transmission and reception unit 401 receives print data from the network I/F 205.

A data interpretation unit 402 reads print data received by the transmission and reception unit 401 via a control unit 403 and interprets drawing information included in the print data. The drawing information extracted as a result of the data interpretation processing is sent to a renderer 404 via the control unit 403 and is thus used for rendering processing.

The control unit 403 performs the overall control operations for various processing operations including reception of print data, data interpretation, rendering of an image, management of terminal information and print setting information described below, and remote setting screen control in the first exemplary embodiment.

A renderer 404 generates a bitmap image from drawing information transmitted from the data interpretation unit 402 with use of the RIP 204. The generated bitmap image is sent to the printer engine 209 via the device I/F 207, so that image formation processing on a sheet of print paper is performed.

A capability information management unit 405 stores and manages, as capability information, information about a processing allowance attribute serving as a capability barometer for an image forming apparatus described below. The capability information management unit 405 transmits the capability information to the client terminal 102 in response to a request for capability response communication from the client terminal 102. Furthermore, the capability information includes, for example, the contents of processing operations which the image forming apparatus 101 is able to perform and setting information about the image forming apparatus 101.

<Software Module Diagram of Client Terminal>

Figure 5:
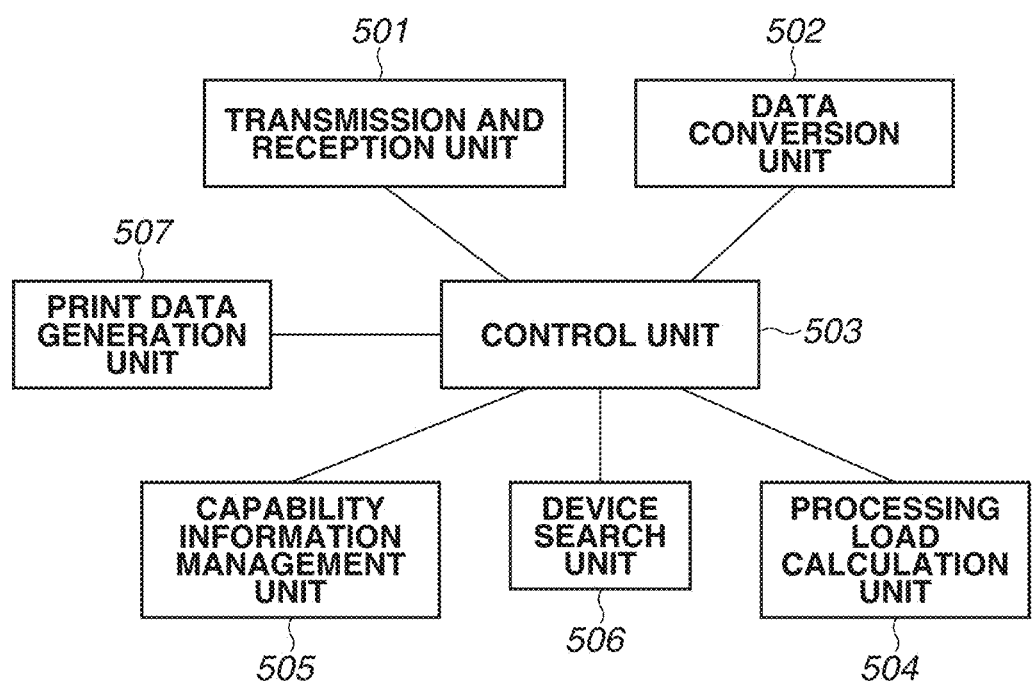
FIG. 5 is a diagram illustrating an example of software modules of the client terminal in the first exemplary embodiment.

FIG. 5 is a diagram illustrating an example of a configuration of software modules of the client terminal 102 in the first exemplary embodiment. The software modules illustrated in FIG. 5 are stored as a program in the auxiliary storage unit 303, are loaded onto the main storage unit 302, and are executed by the central processing unit 301.

A transmission and reception unit 501 outputs print data from the network I/F 304.

A print data generation unit 507 generates print data of the PDF format based on a user operation for starting printing.

A data conversion unit 502 converts the print data of the PDF format generated by the print data generation unit 507 into print data of the raster format based on a calculation result obtained by a processing load calculation unit 504. The converted print data is transmitted from the transmission and reception unit 501 to the image forming apparatus 101 via a control unit 503.

The control unit 503 performs the overall control operations for various processing operations including reception of device capability information, storing and management of capability information, processing load calculation, and data conversion control that is based on a result of the processing load calculation in the first exemplary embodiment.

The processing load calculation unit 504 refers to capability information about a targeted image forming apparatus stored in a capability information management unit 505, and estimates a processing load occurring when processing of print data is executed in the PDF format or the raster format.

The capability information management unit 505 retains and manages, as capability information described below, the processing allowance attribute of the image forming apparatus 101 registered with the client terminal 102. Furthermore, information about settings of the image forming apparatus 101 is also included in the capability information and is thus managed by the capability information management unit 505.

A device search unit 506 searches for a device which is able to communicate with the client terminal 102. For example, the device search unit 506 controls the OS of the client terminal 102 and software installed on the client terminal 102 and detects an image forming apparatus connected to the same network as that connected to the client terminal 102. While, in the first exemplary embodiment, an example in which the device search unit 506 detects an image forming apparatus connected to the same network is described, the device search unit 506 can also be configured to detect a device connected to a different network as long as the device is able to communicate with the client terminal 102.

<Sequence Diagram in First Exemplary Embodiment>

Next, the entire sequence including the transmission and reception of device capability information, processing load calculation, print data optimization, the transmission and reception of print data, and execution of print processing, which are performed by the client terminal 102 and the image forming apparatus 101 in the first exemplary embodiment is described with reference to FIG. 6.

First, in step S101, the client terminal 102 searches for an image forming apparatus 101 connected to the same network as that connected to the client terminal 102. The client terminal 102 searches for an image forming apparatus 101 by using a search function of the OS or a search function of software installed on the client terminal 102.

Next, in step S102, the image forming apparatus 101 transmits, to the client terminal 102, a response indicating that the image forming apparatus 101 is connected to the same network as that connected to the client terminal 102.

Next, in step S103, the client terminal 102 requests device capability information, which is a processing allowance attribute indicating a processing capability of the image forming apparatus 101, from the image forming apparatus 101 having transmitted a connection response to the client terminal 102.

Next, in step S104, the image forming apparatus 101 sets device capability. The device capability includes object layout information, which makes a rendering processing load larger, and object type information, which is high in a load of interpretation processing. The object layout information, which makes a rendering processing load larger, is set based on a method of rendering which the image forming apparatus 101 employs. Moreover, the object type information, which is high in a load of interpretation processing, is set based on a method of interpretation which the image forming apparatus 101 employs. Furthermore, while, in the first exemplary embodiment, the image forming apparatus 101 performs the present processing in association with a device capability information request from the client terminal 102, the present processing is not limited to being performed at this timing. For example, a configuration in which, when being powered on for the first time, the image forming apparatus 101 internally calculates device capability in the process of the first startup sequence and retains the device capability since that time can be employed.

Next, in step S105, the image forming apparatus 101 transmits the set capability information (information about the set device capability) as a response to the client terminal 102.

Next, in step S106, the client terminal 102 registers information about the image forming apparatus 101 in the form of including the received capability information on a registration list of image forming apparatuses which the client terminal 102 itself manages. Thus far is the processing for registering the image forming apparatus 101 with the client terminal 102.

When the user operates the client terminal 102 to issue an instruction for printing via an application installed on the client terminal 102, processing in step S107 and subsequent steps is performed.

Next, in step S107, the client terminal 102 converts, into PDF data, print data serving as a print target for executing a print job. Furthermore, the present sequence diagram is expressed in the form of being separated into a registration sequence for an image forming apparatus (steps S101 to S106) and a print job inputting sequence (steps S107 to S111). However, these sequences can be performed as a serial sequence. In a case where the registration for an image forming apparatus and the inputting of a print job are performed in succession, a predetermined period does not occur between steps S106 and S107.

Next, in step S108, the client terminal 102 estimates a processing load and a drawing processing cost by referring to the capability information about the image forming apparatus 101 serving as a target for inputting while analyzing the content of the generated print data of the PDF format.

Next, in step S109, the client terminal 102 performs optimization of the data format by determining which of the PDF format and the raster format to employ as a data format of the print data, based on a result of estimation of the processing load obtained in step S108.

Next, in step S110, the client terminal 102 transmits a print job including the generated print data to the image forming apparatus 101.

Next, in step S111, the image forming apparatus 101 executes the received print job that is based on the print data.

With the above-described sequence, the transmission and reception of device capability information, processing load calculation, print data optimization, the transmission and reception of print data, and execution of print processing are performed by the client terminal 102 and the image forming apparatus 101 in the first exemplary embodiment.

<Details of Estimation of Processing Load and Drawing Processing Cost>

As mentioned above, the processing allowance attribute stored in the capability information indicating the processing capability of the image forming apparatus 101 includes, stored therein, information required for the client terminal 102 to estimate a drawing processing cost. In the first exemplary embodiment, an example in which object layout information, which makes a processing load for rendering processing larger, and object type information, which makes a processing load for interpretation processing larger, are stored in the processing allowance attribute is described.

The object layout information, which makes a processing load for rendering processing larger, is the number of objects allowable in one page or the maximum number of occurrences of overlapping of objects allowable in one page.

In the first exemplary embodiment, an example in which there are two types of rendering processing, i.e., a scanline method and a painter's method, is described. The scanline method is a method of dividing a drawing target region into scanline regions, calculating the number of occurrences of overlapping of objects included in each scanline region, and performing rendering processing on only a display region. Since the scanline method sets only a display region as a rendering target, it is not expected that a processing load becomes larger depending on the number of objects included in one page. On the other hand, as the number of occurrences of overlapping of objects is larger, it takes a longer time to perform calculation processing. Therefore, in a case where the scanline method is selected in the image forming apparatus 101, the client terminal 102 determines whether a rendering processing load in the image forming apparatus 101 is high, based on the number of occurrences of overlapping of objects.

On the other hand, the painter's method is a method of performing rendering processing on all of the objects included in one page on an object-by-object basis in ascending order of the level of overlapping. The painter's method is simple in terms of algorithm and is less affected by the number of occurrences of overlapping of objects included in one page. On the other hand, in the painter's method, the number of objects included in one page is related to a processing speed in the image forming apparatus 101. Therefore, in a case where the painter's method is selected in the image forming apparatus 101, the client terminal 102 determines whether a rendering processing load in the image forming apparatus 101 is high, based on the number of objects included in one page.

With regard to the object type information, which makes a processing load for interpretation processing larger, the type of an object corresponding to a method of interpretation processing which is set in the image forming apparatus 101 is set.

In the first exemplary embodiment, an example in which there are two types of interpretation processing for PDF data, i.e., a PDFtoPS method and a DirectPDF method, is described. The PDFtoPS method is a method of once converting PDF data into the PostScript (PS) format and causing a PS interpreter to perform interpretation processing. When PDF data is converted into the PS format, it takes a long time to perform conversion of a type of object which is not supported by the PS format. For example, converting a transparently drawn object which is not supported by the PS format into the PS format requires drawing processing for artificially reproducing a transparently drawn image, so that it takes a long time to perform such processing. Moreover, it also takes a long time to perform processing for color-space-converting an ICCBased color space object of the PDF format, which is not supported by the PS format, into a CIEBased color space object of the PS format. In a case where the PDFtoPS method is employed as a method of interpretation processing, the client terminal 102 determines whether an interpretation processing load in the image forming apparatus 101 is high, based on the number of transparent objects and the number of ICCBased color space objects.

On the other hand, in the DirectPDF method, which directly performs interpretation processing on data of the PDF format, it takes a long time to process an ICCBased color space object having a transparency attribute. Therefore, in a case where the DirectPDF method is employed as a method of interpretation processing, the client terminal 102 determines whether an interpretation processing load in the image forming apparatus 101 is high, based on the number of ICCBased color space objects having a transparency attribute.

Furthermore, in an OS which is employed by a high functional portable terminal, such as a smartphone, assumed as a configuration example of the client terminal in the first exemplary embodiment, in a standard printing function, control of a print job sequence using an Internet Printing Protocol (IPP) attribute is performed. In this configuration example, as an example of the processing allowance attribute described in the first exemplary embodiment or an IPP attribute using capability information, an attribute obtained by extending "pdf-features-supported" or "print-content-optimize" is assumed. The print job sequence is controlled by extending specifications of these IPP attributes and storing, for example, the above-mentioned object layout information, which makes a processing load for rendering processing larger, and the above-mentioned object type information, which makes a processing load for interpretation processing larger.

<Flowchart of Device Search Processing>

Next, a flow of device search processing which is performed by the client terminal 102 is described with reference to FIG. 7.

The client terminal 102 previously registers various pieces of information about the image forming apparatus 101, which serves as a destination for inputting a job at the time of printing of image data, and thus becomes able to select an image forming apparatus for use in printing at the time of inputting of a print job. Therefore, the client terminal 102 searches for an image forming apparatus existing in the same network as that connected to the client terminal 12, receives device capability information about the detected image forming apparatus, and registers such information on an internal list. With regard to processing starting with device search and ending with registration, if the processing has once been performed before execution of a job, the processing is not performed from then on.

When the client terminal 102 starts searching for an image forming apparatus existing in the same network as that connected to the client terminal 12, the present flow starts. Processing for performing a flowchart illustrated in FIG. 7 is implemented by the central processing unit 301 executing a program stored in the main storage unit 302 or the auxiliary storage unit 303 of the client terminal 102.

First, in step S1001, the device search unit 506 starts searching for an image forming apparatus existing in the same network as that connected to the client terminal 12. The device search unit 506 causes the OS of the client terminal 102 or an application installed on the client terminal 102 to operate to search for an image forming apparatus which the client terminal 102 is able to use for printing. Furthermore, in device search performed in step S1001, the device search unit 506 only needs to be able to detect an image forming apparatus which the client terminal 102 is able to use for printing, and the device search unit 506 can detect an image forming apparatus existing on a network different from that connected to the client terminal 102.

Next, in step S1002, the device search unit 506 determines whether an image forming apparatus has been detected. If it is determined that an image forming apparatus has been detected (YES in step S1002), the device search unit 506 advances the processing to step S1003. If it is determined that no image forming apparatus has been detected (NO in step S1002), the device search unit 506 returns the processing to step S1001, in which the device search unit 506 repeats the processing.

In step S1003, the capability information management unit 505 transmits a request for device capability information to the image forming apparatus detected by searching, and then receives device capability from the detected image forming apparatus. The device capability to be received here has, described therein, types of image processing and post-processing which the detected image forming apparatus is able to perform. Additionally, the device capability has, described therein, parameters and threshold values used for determining a processing load corresponding to an interpretation method in the detected image forming apparatus and types and threshold values of objects high in load corresponding to a rendering method in the detected image forming apparatus. In the first exemplary embodiment, acquiring the above-mentioned parameters used for determining a processing load and the types of objects high in processing load enables determining the format of image data which the client terminal 102 transmits to the image forming apparatus 101.

In step S1004, the capability information management unit 505 registers the device capability information received from the detected image forming apparatus on an internal list. The device capability received by the client terminal 102 is managed with, for example, tables described below illustrated in FIGS. 12A and 12B.

Upon completion of registration processing about the detected image forming apparatus, the present flow ends.

Thus far is the device search processing which is performed by the client terminal 102.

Furthermore, in the first exemplary embodiment, an example in which device search is performed at timing at which to register the image forming apparatus 101 with the client terminal 102 has been described. A configuration in which, each time when being instructed to perform printing by an application installed on the client terminal 102, the client terminal 102 performs device search and acquires information about an image forming apparatus to which the client terminal 102 is able to connect can be employed.

<Flowchart of Device Capability Generation Processing>

Figure 7:
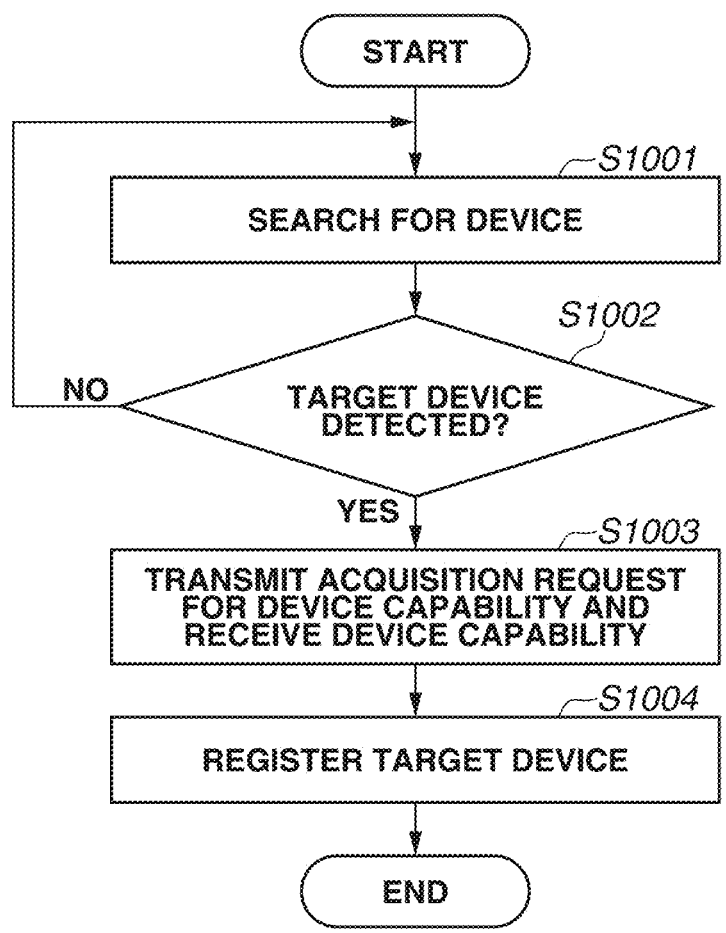
FIG. 7 is a flowchart illustrating device search processing which the client terminal performs in the first exemplary embodiment.
Figure 11:
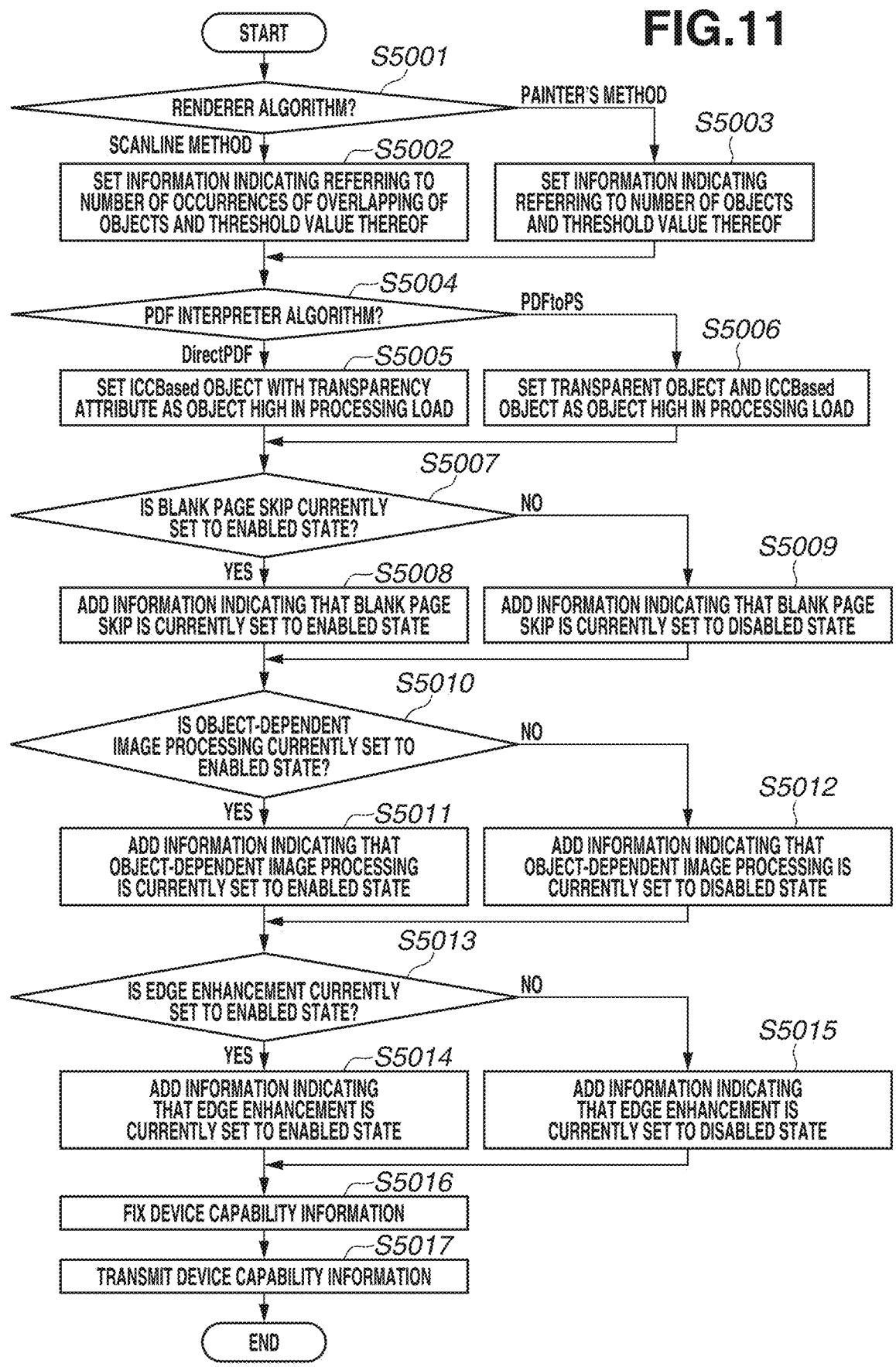
FIG. 11 is a flowchart illustrating processing which the image forming apparatus performs to set device capability in the first exemplary embodiment.

Here, processing which the image forming apparatus 101 performs to generate device capability, which is to be acquired in step S1003 illustrated in FIG. 7, is described with reference to FIG. 11. The flowchart illustrated in FIG. 11 is started based on the image forming apparatus 101 receiving an acquisition request for device capability from the client terminal 102. Moreover, a program for performing the processing described in FIG. 11 is stored in the main storage unit 202 or the auxiliary storage unit 203 and is implemented by the central processing unit 201 executing the program.

In step S5001, the capability information management unit 405 determines which of the scanline method and the painter's method a rendering method which the image forming apparatus 101 is able to perform is. Furthermore, the rendering method which the image forming apparatus 101 is able to perform is a factory-configured method and is thus a method which the user is unable to change. If it is determined that the rendering method is the scanline method (SCANLINE METHOD in step S5001), the capability information management unit 405 advances the processing to step S5002. If it is determined that the rendering method is the painter's method (PAINTER'S METHOD in step S5001), the capability information management unit 405 advances the processing to step S5003.

In step S5002, the capability information management unit 405 sets, to the device capability, using the number of occurrences of overlapping of objects as a parameter for determining a rendering processing load and the number of objects serving as a threshold value thereof. Furthermore, the threshold value to be set here is a previously determined value.

In step S5003, the capability information management unit 405 sets, to the device capability, the number of objects included in one page as a parameter for determining a rendering processing load and a threshold value thereof. Furthermore, the threshold value to be set here is a previously determined value.

In step S5004, the capability information management unit 405 determines which of the PDFtoPS method and the DirectPDF method an interpretation method for image data which is received from the client terminal 102 is. The interpretation method is a method which the user is able to set by operating the operation unit 208 of the image forming apparatus 101. While, in the first exemplary embodiment, the user is assumed to set the interpretation method, a configuration in which the interpretation method is previously determined at the time of factory shipment and the user is unable to change the interpretation method can be employed. If it is determined that the interpretation method is the DirectPDF method (DirectPDF in step S5004), the capability information management unit 405 advances the processing to step S5005. If it is determined that the interpretation method is the PDFtoPS method (PDFtoPS in step S5004), the capability information management unit 405 advances the processing to step S5006.

In step S5005, the capability information management unit 405 sets, to the device capability, an ICCBased color space object with a transparency attribute as an object high in processing load for interpretation processing. Additionally, the capability information management unit 405 sets, to the device capability, a threshold value used for determining whether a load for processing is high when the above-mentioned type of object is present. The threshold value is a previously determined value.

In step S5006, the capability information management unit 405 sets, to the device capability, an object with a transparency attribute and an ICCBased color space object as an object high in processing load for interpretation processing. Additionally, the capability information management unit 405 sets, to the device capability, a threshold value used for determining whether a load for processing is high when the above-mentioned type of object is present. The threshold value is a previously determined value.

In step S5007, the capability information management unit 405 determines whether a blank page skip function is currently set to an enabled state. The blank page skip function is a function of preventing any blank page in image data from being output and is able to be set to one of an enabled state and a disabled state by the user. If it is determined that the blank page skip function is currently set to an enabled state (YES in step S5007), then in step S5008, the capability information management unit 405 adds, to the device capability, information indicating that the blank page skip function is currently set to an enabled state. If it is determined that the blank page skip function is currently set to a disabled state (NO in step S5007), then in step S5009, the capability information management unit 405 adds, to the device capability, information indicating that the blank page skip function is currently set to a disabled state.

In step S5010, the capability information management unit 405 determines whether object-dependent image processing is currently set to an enabled state. The object-dependent image processing is a function of varying image processing to be used depending on respective attributes of photograph, character, and graphic included in a document which contains a mixture of photographs, characters, and graphics. If it is determined that the object-dependent image processing is currently set to an enabled state (YES in step S5010), then in step S5011, the capability information management unit 405 adds, to the device capability, information indicating that the object-dependent image processing is currently set to an enabled state. If it is determined that the object-dependent image processing is currently set to a disabled state (NO in step S5010), then in step S5012, the capability information management unit 405 adds, to the device capability, information indicating that the object-dependent image processing is currently set to a disabled state.

In step S5013, the capability information management unit 405 determines whether edge enhancement processing is currently set to an enabled state. The edge enhancement processing is processing for enhancing the edge of a character or object. If it is determined that the edge enhancement processing is currently set to an enabled state (YES in step S5013), then in step S5014, the capability information management unit 405 adds, to the device capability, information indicating that the edge enhancement processing is currently set to an enabled state. If it is determined that the edge enhancement processing is currently set to a disabled state (NO in step S5013), then in step S5015, the capability information management unit 405 adds, to the device capability, information indicating that the edge enhancement processing is currently set to a disabled state.

Performing processing described in steps S5007 to S5015 enables adding, to the device capability, capability information required for determining whether it takes a long time to perform processing which is performed when image data of the raster format has been transmitted to the image forming apparatus 101.

In step S5016, the capability information management unit 405 finalizes (fixes) the device capability information as print setting information.

In step S5017, the capability information management unit 405 transmits the finalized device capability information to the client terminal 102, which is a request source for device capability information. Upon completion of transmission processing for the device capability information, the present flow ends.

Thus far is the device capability calculation processing which is performed by the image forming apparatus 101 in the first exemplary embodiment.

Furthermore, in the first exemplary embodiment, the processing described in FIG. 11 is started based on the image forming apparatus 101 receiving an acquisition request for device capability from the client terminal 102. The processing described in FIG. 11 can be configured to be performed on a periodic basis or can be configured to be performed at predetermined timing, such as timing of powering-on of the image forming apparatus 101 or timing of return from sleep thereof.

<Device Capability Information Table>

Next, the data structure of a device capability information table in the first exemplary embodiment is described with reference to FIGS. 12A and 12B. Each of the tables illustrated in 12A and 12B is a table used for managing device capability which the client terminal 102 has received from the image forming apparatus 101.

The device capability information table illustrated in FIG. 12A is a table which is managed in a list form for respective printer names of image forming apparatuses and in which information to be referred to for determining whether to calculate a rendering processing load is stored.

The column "Printer Name" indicates the name of an image forming apparatus which transmitted device capability. "Printer Name" can be, for example, an identification number specific to each image forming apparatus. The column "Parameter for Determining Processing Load (Threshold Value)" indicates a parameter used for determining whether a processing load determined based on the rendering method of each image forming apparatus is large, and the inside of parentheses therein indicates a threshold value. In the first exemplary embodiment, depending on the method of rendering processing in each image forming apparatus, the number of occurrences of overlapping of objects in one page or the number of objects included in one page is used as a parameter. For example, if the printer name is "Printer A", in a case where the maximum number of occurrences of overlapping of objects in one page has exceeded "10", it is determined that the print data of interest is data high in processing load for rendering. The column "Object Type High in Load (Threshold Value)" indicates the type of an object high in processing load determined based on the interpretation method of a printer, and the inside of parentheses therein indicates a threshold value. For example, if the printer name is "Printer A", in a case where the number of ICCBased objects with a transparency attribute included in one page has exceeded "5", it is determined that the print data of interest is data high in processing load for interpretation processing. Furthermore, in a case where, as in Printer B, a plurality of types of objects is set as types of objects high in load, a threshold value for the total number of the plurality of types of objects is assumed to be described in the parentheses.

The device capability information table illustrated in FIG. 12B is a table which is managed in a list form for respective printer names of image forming apparatuses and which is used for determining whether there is a possibility of a processing load becoming larger when print data has been changed into the raster format. The device capability information table illustrated in FIG. 12B is also set based on device capability which is acquired from the image forming apparatus 101. The column "Printer Name" indicates the name of each image forming apparatus as with that illustrated in FIG. 12A, and can indicate, for example, an identification number of each image forming apparatus. The column "Blank Page Skip" indicates whether the blank page skip function is currently set to an enabled state in each image forming apparatus. The column "Object-Dependent Image Processing" indicates whether the object-dependent image processing is currently set to an enabled state in each image forming apparatus. The column "Edge Enhancement" indicates whether the edge enhancement processing is currently set to an enabled state in each image forming apparatus. In this way, the device capability information table illustrated in FIG. 12B has, stored therein, setting values for the respective setting items in each image forming apparatus.

<Flowchart of Print Data Optimization Processing>

Next, optimization processing for print data which is performed when the client terminal 102 has received a printing instruction is described with reference to FIG. 8. Upon receiving a printing request from the user, the client terminal 102 generates print data of the PDF format. The client terminal 102 performs estimation of a drawing processing load for the PDF format based on a drawing object structure of the converted PDF data and the device capability information, and determines whether the PDF processing load is ready in time for the print speed of the image forming apparatus 101. If the PDF processing load is not ready in time for the print speed of the image forming apparatus 101, the client terminal 102 determines whether a setting high in a processing load for image data of the raster format is currently performed on the image forming apparatus 101. If a setting high in the processing load is not currently performed, the client terminal 102 converts the PDF data into the raster format and then transmits the data of the raster format to the image forming apparatus 101.

Figure 8:
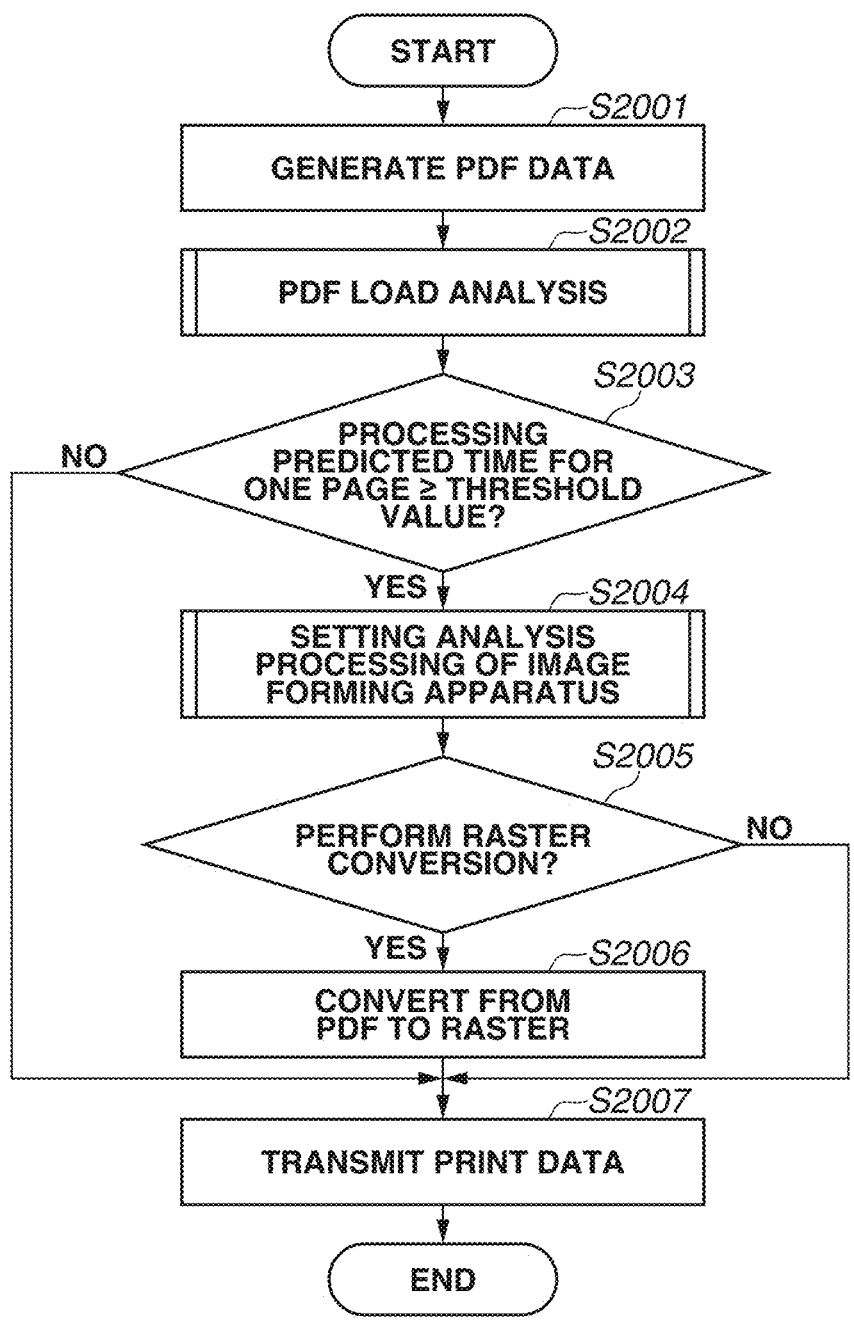
FIG. 8 is a flowchart illustrating print data optimization processing which the client terminal performs in the first exemplary embodiment.

A program used for performing processing described in the flowchart of FIG. 8 is stored in the main storage unit 302 or the auxiliary storage unit 303, and the processing is implemented by the central processing unit 301 executing the program.

When the client terminal 102 receives a printing request from the user, the present flow starts.

In step S2001, the print data generation unit 507 generates print data of the PDF format based on document data, which is set as a print target, and a print setting therefor.

In step S2002, the processing load calculation unit 504 estimates a processing load which would occur when the PDF data generated in step S2001 has been processed. Details of this processing are described below with reference to FIG. 9. In step S2002, the processing load calculation unit 504 performs processing described in FIG. 9 to calculate a processing predicted time for each page.

In step S2003, the processing load calculation unit 504 determines whether the maximum value of the processing predicted time calculated in step S2002 is greater than or equal to a previously determined threshold value. If it is determined that the processing load for PDF data is greater than or equal to the predetermined threshold value (YES in step S2003), the processing load calculation unit 504 advances the processing to step S2004. If it is determined that the processing load for PDF data is less than the predetermined threshold value (NO in step S2003), the processing load calculation unit 504 advances the processing to step S2007.

In step S2004, the processing load calculation unit 504 performs setting analysis processing of image forming apparatus for determining whether the image forming apparatus 101 is currently set to a setting in which it takes a long time to perform analysis of image data of the raster format, based on the device capability. The processing which the processing load calculation unit 504 performs in step S2004 is described below with reference to FIG. 10.

In step S2005, the processing load calculation unit 504 determines whether to perform conversion into the raster format, based on a result of determination obtained in step S2004. In a case where it is determined that the image forming apparatus 101 is currently set to a setting in which it takes a long time to perform processing of data of the raster format, the processing load calculation unit 504 determines not to perform conversion processing into the raster format (NO in step S2005), and then advances the processing to step S2007. In a case where it is determined that the image forming apparatus 101 is not currently set to a setting in which it takes a long time to perform analysis of data of the raster format, the processing load calculation unit 504 determines to perform conversion into the raster format (YES in step S2005), and then advances the processing to step S2006.

In step S2006, the data conversion unit 502 performs print data format conversion of image data of the PDF format generated in step S2001 into the raster format. While, here, the data conversion unit 502 performs re-conversion into the raster format by rasterizing data of the PDF format, if a configuration in which the data conversion unit 502 is able to refer to original image data is employed, the data conversion unit 502 can be configured to generate image data of the raster format without via the PDF format. Generating print data of the raster format in step S2006 enables preventing a drawing command high in load for drawing processing in the image forming apparatus 101 from being included in print data to be transmitted to the image forming apparatus 101.

In step S2007, the transmission and reception unit 501 transmits a print job including the generated print data to the image forming apparatus 101. Upon completion of transmission processing of the print job, the present flow ends.

Thus far is the print data optimization processing which is performed by the client terminal 102 in the first exemplary embodiment. In this way, even in a case where the image forming apparatus 101 is able to deal with data of the PDF format, if it takes a long time to perform interpretation processing and rasterization processing in the image forming apparatus 101, the rasterization processing is able to be performed by the client terminal 102.

<Flowchart of PDF Load Analysis Processing>

Figure 9:
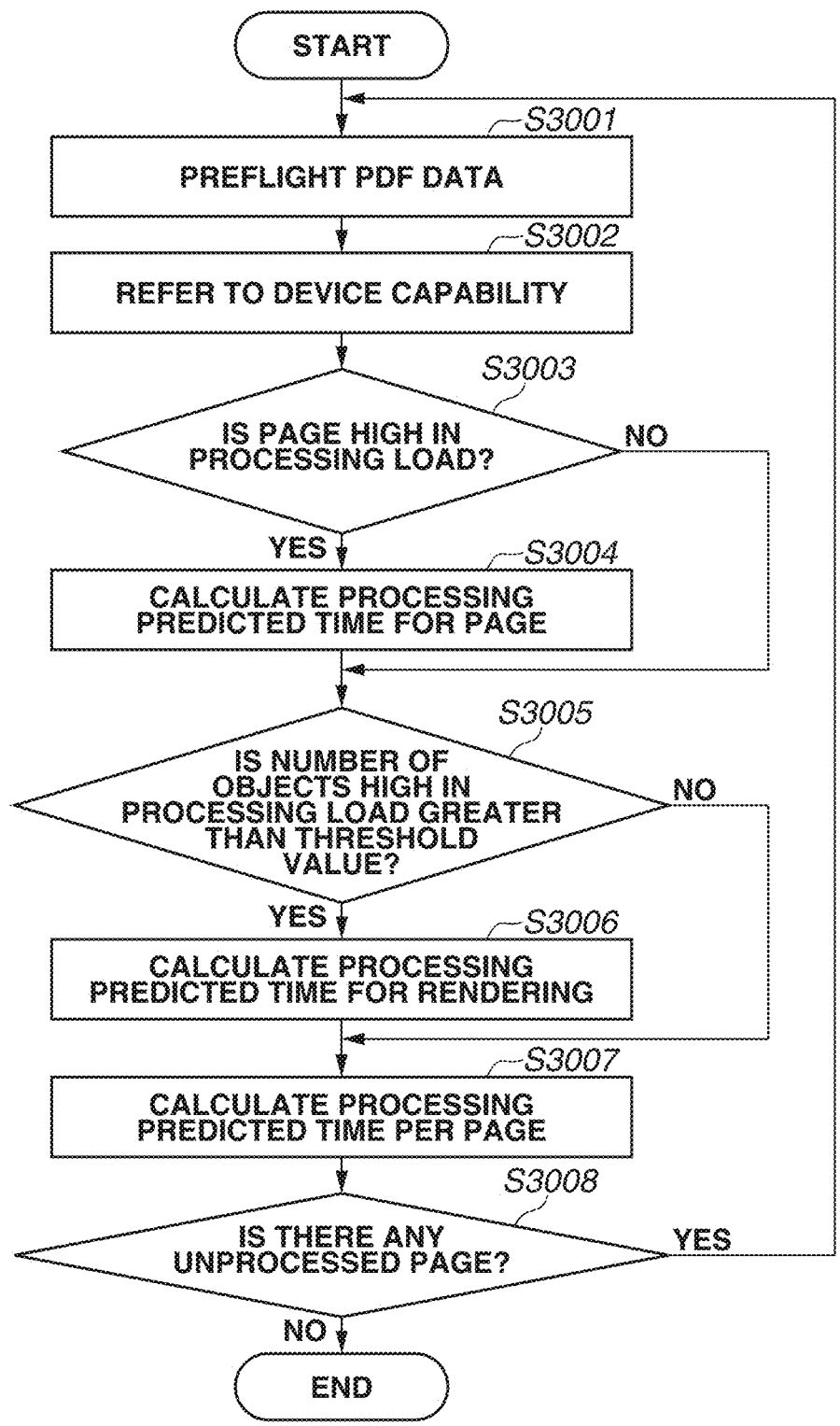
FIG. 9 is a flowchart illustrating Portable Document Format (PDF) load analysis processing which the client terminal performs in the first exemplary embodiment.

Next, PDF load analysis processing which is performed by the client terminal 102 in the first exemplary embodiment is described with reference to FIG. 9. Before inputting a print job to the image forming apparatus 101, the client terminal 102 performs internal syntax analysis of print data generated in the PDF format by preflight and thus analyzes how many objects with what attribute are included in the print data in what layout. The client terminal 102 determines whether the PDF data is PDF data in which it takes a long time to be processed in the image forming apparatus 101, based on information extracted from the PDF data and device capability acquired from the image forming apparatus 101. When the client terminal 102 starts processing in step S2002 illustrated in FIG. 8, the present flow starts. Furthermore, processing described in FIG. 9 is implemented by the central processing unit 301 of the client terminal 102 executing a program stored in at least one of the main storage unit 302 and the auxiliary storage unit 303.

In step S3001, the processing load calculation unit 504 performs internal syntax analysis of PDF data generated in step S2001 by preflight. The processing load calculation unit 504 identifies, from a drawing command included in PDF data for one page, types and the number of objects included in the PDF data.

In step S3002, the processing load calculation unit 504 refers to device capability information about an image forming apparatus serving as a print job inputting destination acquired in the device search processing illustrated in FIG. 7.

In step S3003, the processing load calculation unit 504 determines whether the page of interest is a page high in processing load for rendering processing, based on a result of the preflight internal syntax analysis performed on the PDF data in step S3001. The processing load calculation unit 504 determines whether the page of interest is a page high in processing load, based on the parameter and the threshold value for determining a processing load shown in the table illustrated in FIG. 12A. For example, in a case where the printer of interest is "Printer A" illustrated in FIG. 12A, the processing load calculation unit 504 determines whether the number of occurrences of overlapping of objects in one page exceeds "10". If the number of occurrences of overlapping of objects exceeds "10", the processing load calculation unit 504 determines that the page of interest is a page high in processing load. On the other hand, if the number of occurrences of overlapping of objects is less than or equal to "10", the processing load calculation unit 504 determines that the page of interest is not a page high in processing load. Moreover, in a case where the printer of interest is "Printer C", if the number of objects included in one page exceeds "15", the processing load calculation unit 504 determines that the page of interest is a page high in processing load. In the other hand, if the number of objects included in one page is less than or equal to "15", the processing load calculation unit 504 determines that the page of interest is not a page high in processing load. If it is determined that the page of interest is a page high in processing load (YES in step S3003), the processing load calculation unit 504 advances the processing to step S3004. If it is determined that the page of interest is not a page high in processing load (NO in step S3003), the processing load calculation unit 504 advances the processing to step S3005.

In step S3004, the processing load calculation unit 504 calculates, with regard to a page determined to be a page high in processing load, a processing predicted time for the page. The processing load calculation unit 504 calculates the processing predicted time by multiplying a processing time for one object included in the device capability information by the number regarding objects extracted in step S3001. For example, suppose that, in "Printer A", the number of occurrences of overlapping of objects is "20". In a case where the device capability indicates that the processing time for one object is 3 seconds, the processing load calculation unit 504 calculates a processing time of 3*20=60 seconds. Furthermore, a time estimated to be required for processing of one object is a value previously determined based on, for example, a simulation. Furthermore, the calculation of a processing predicted time of a page determined to be a page high in processing load is not limited to the above-mentioned method but can be performed by using another known method.

In step S3005, the processing load calculation unit 504 determines whether the number of objects high in processing load for interpretation processing is greater than a threshold value, based on a result of the preflight internal syntax structure analysis performed on the PDF data in step S3001. Then, the processing load calculation unit 504 determines whether the number of objects of the type indicated by the device capability included in one page is greater than a threshold value indicated by the device capability. In step S3005, the processing load calculation unit 504 determines whether a command corresponding to an object of the type indicated by the device capability is included in the PDF data. Additionally, the processing load calculation unit 504 compares the number of such drawing commands included in the PDF data with a threshold value indicated by the device capability. In a case where the interpretation method employed in the target image forming apparatus is the PDFtoPS method, the processing load calculation unit 504 compares the number of objects having a transparency attribute and ICCBased color space objects with a threshold value. In a case where the interpretation method employed in the target image forming apparatus is the DirectPDF method, the processing load calculation unit 504 compares the number of ICCBased color space objects having a transparency attribute with a threshold value. If it is determined that the number of objects high in processing load is greater than the threshold value (YES in step S3005), the processing load calculation unit 504 advances the processing to step S3006. If it is determined that the number of objects high in processing load is less than or equal to the threshold value (NO in step S3005), the processing load calculation unit 504 advances the processing to step S3007. For example, in the case of "Printer A" illustrated in FIG. 12A, if the number of ICCBased objects with a transparent attribute exceeds "5", the processing load calculation unit 504 advances the processing to step S3006. On the other hand, if the number of ICCBased objects with a transparent attribute is less than or equal to "5", the processing load calculation unit 504 advances the processing to step S3007.

In step S3006, the processing load calculation unit 504 calculates a processing predicted time for rendering processing. The processing load calculation unit 504 calculates a rendering processing predicted time by multiplying a processing time for one object of the type high in processing load included in the device capability information by the number of objects extracted in step S3001. For example, suppose that, in "Printer A", a processing time for rendering processing for one object is 4 seconds and the number of objects of the type high in processing load is "20". The processing load calculation unit 504 calculates 4*20=80 seconds as a processing predicted time. Furthermore, a time estimated to be required for processing of one object is a value previously determined based on, for example, a simulation. Furthermore, the calculation of the processing predicted time is not limited to the above-mentioned method but can be performed by using another known method.

In step S3007, the processing load calculation unit 504 calculates a processing predicted time for one page based on the processing predicted times calculated in steps S3004 and S3006. The processing load calculation unit 504 calculates a processing predicted time for one page by adding together the processing predicted time obtained in step S3004 and the processing predicted time obtained in step S3006. Furthermore, while, in the first exemplary embodiment, the sum of the processing predicted times calculated in steps S3004 and S3006 is set as a processing predicted time for one page, the method of calculating a processing predicted time for one page is not limited to the above-mentioned method. For example, in steps S3004 and S3006, the processing load calculation unit 504 can calculate a processing predicted time by using a result obtained by simulating a processing time in an image forming apparatus having a normal hardware configuration. In step S3007, the processing load calculation unit 504 can estimate a processing time by taking into account a hardware configuration of the image forming apparatus 101. For example, in a case where, under the hardware configuration of the image forming apparatus 101, information indicating that the image forming apparatus 101 performs processing at a speed 1.2 times that of a normal hardware configuration is described in the device capability, the processing load calculation unit 504 predicts a processing time in the following method. The processing load calculation unit 504 predicts a processing time for one page by dividing the sum of processing predicted times obtained in steps S3004 and S3006 by "1.2".

In step S3008, the processing load calculation unit 504 determines whether there is any unprocessed page. If it is determined that there is any unprocessed page (YES in step S3008), the processing load calculation unit 504 returns the processing to step S3001, and then performs processing in steps S3001 to S3007 for a next page. If it is determined that there is no unprocessed page (NO in step S3008), the processing load calculation unit 504 ends the processing described in FIG. 9. Performing the processing described in FIG. 9 enables obtaining a processing predicted time for each page. Furthermore, in step S2003 illustrated in FIG. 8, the maximum value of the processing predicted time obtained in the flowchart of FIG. 9 is compared with a threshold value.

Thus far is the PDF load analysis processing which is performed by the client terminal 102 in the first exemplary embodiment. Furthermore, a processing time for one object which is used in each of steps S3004 and S3006 can be previously stored in the client terminal 102 or can be communicated via the device capability from the image forming apparatus 101.

<Flowchart of Print Setting Influence Analysis Processing>

Figure 10:
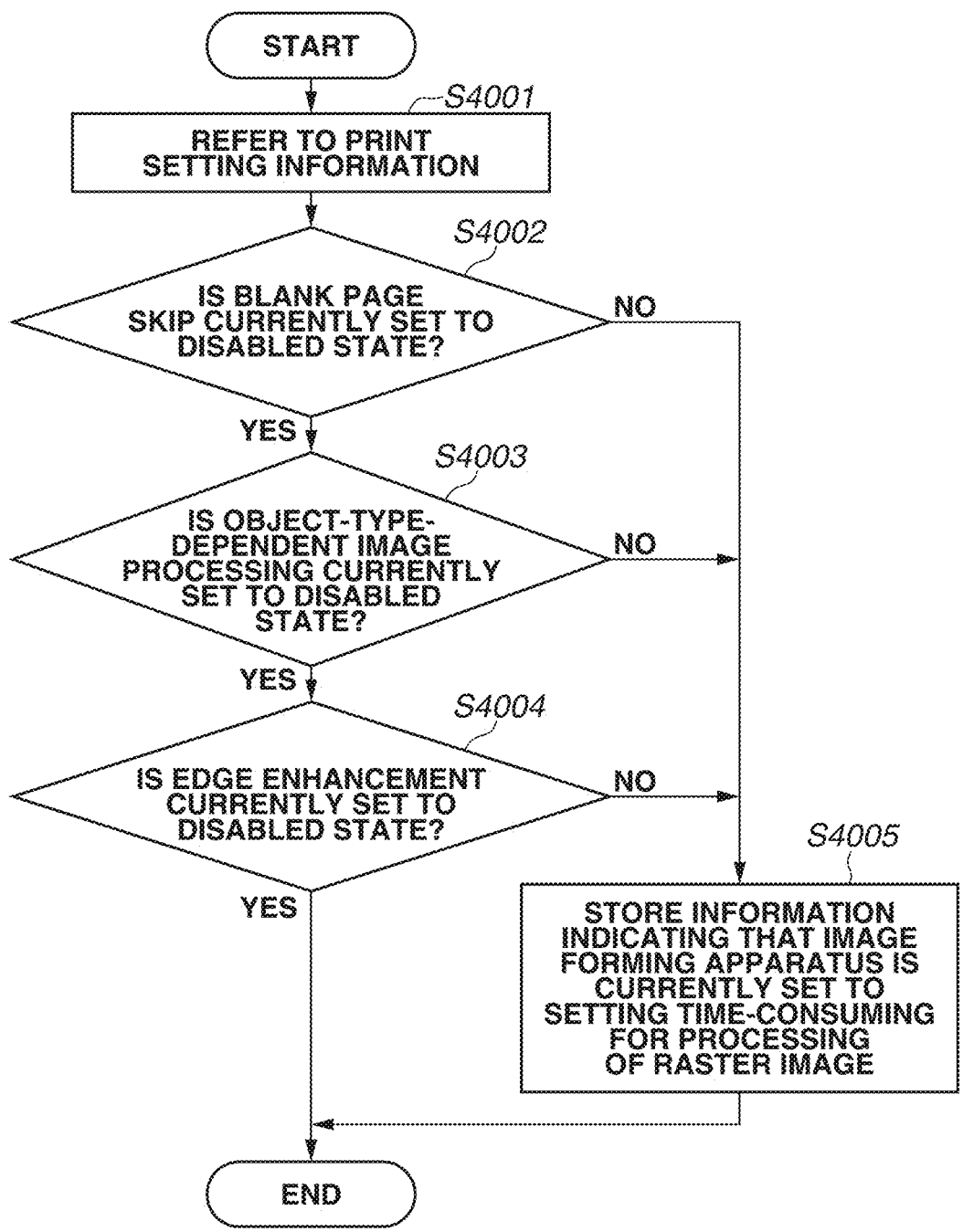
FIG. 10 is a flowchart illustrating print setting influence analysis processing which the client terminal performs in the first exemplary embodiment and a second exemplary embodiment.

Next, a flow of print setting influence analysis processing which is performed by the client terminal 102 in the first exemplary embodiment is described with reference to FIG. 10. In the first exemplary embodiment, in a case where the data structure of PDF data generated for a print job is a structure which makes a processing load in an image forming apparatus larger, the client terminal 102 performs rendering on the PDF data and then inputs the generated raster image to the image forming apparatus. However, there are settings of the image forming apparatus in which, if print data of the raster format is input, pixel calculation processing for drawing object discrimination processing becomes required and, on the contrary, a processing load becomes higher, such as blank page skip, object-type-dependent image processing, and an edge enhancement function. The client terminal 102 refers to a setting of the image forming apparatus and thus determines whether to perform conversion into the raster format.

When the client terminal 102 starts processing in step S2004 illustrated in FIG. 8, the present flow starts. Processing described in the present flow is implemented by the central processing unit 301 of the client terminal 102 executing a program stored in at least one of the main storage unit 302 and the auxiliary storage unit 303.

In step S4001, the processing load calculation unit 504 refers to setting information about the image forming apparatus 101 included in the device capability information.

In step S4002, the processing load calculation unit 504 determines whether blank page skip is currently set to a disabled state in the setting information. If it is determined that the blank page skip is currently set to a disabled state (YES in step S4002), the processing load calculation unit 504 advances the processing to step S4003. If it is determined that the blank page skip is currently set to an enabled state (NO in step S4002), the processing load calculation unit 504 advances the processing to step S4005.

In step S4003, the processing load calculation unit 504 determines whether object-type-dependent image processing is currently set to a disabled state. If it is determined that the object-type-dependent image processing is currently set to a disabled state (YES in step S4003), the processing load calculation unit 504 advances the processing to step S4004. If it is determined that the object-type-dependent image processing is currently set to an enabled state (NO in step S4003), the processing load calculation unit 504 advances the processing to step S4005.

In step S4004, the processing load calculation unit 504 determines whether an edge enhancement function is currently set to a disabled state. If it is determined that the edge enhancement function is currently set to a disabled state (YES in step S4004), the processing load calculation unit 504 ends the processing. If it is determined that the edge enhancement function is currently set to an enabled state (NO in step S4004), the processing load calculation unit 504 advances the processing to step S4005.

In step S4005, the processing load calculation unit 504 stores information indicating that the image forming apparatus 101 is currently set to a setting which is time-consuming for processing of a raster image. In a case where the image forming apparatus 101 is currently set to a setting which is time-consuming for processing of a raster image, performing the processing in the above-described way enables preventing data of the PDF format from being converted into the raster format by the client terminal 102. After performing step S4005, the processing load calculation unit 504 ends the setting analysis processing of the image forming apparatus 101. Furthermore, in the flowchart of FIG. 10, if any one of blank page skip, object-type-dependent image processing, and an edge enhancement function is currently set to an enabled state, the processing load calculation unit 504 determines that the image forming apparatus 101 is currently set to a setting which is time-consuming for processing of a raster image. A configuration in which, only in a case where a plurality of functions from among the above-mentioned three functions is currently set to an enabled state, the processing load calculation unit 504 determines that the image forming apparatus 101 is currently set to a setting which is time-consuming for processing of a raster image can be employed.

In performing the above-described processing, in a case where it is estimated that it takes a long time to analyze data of the PDF format and perform interpretation processing or rendering processing in the image forming apparatus, rendering processing is able to be performed by the client terminal. In this way, converting the format of print data in the client terminal enables reducing a time required for processing up to printing without the image forming apparatus performing interpretation processing or rendering processing.

In the above-described first exemplary embodiment, a configuration in which the image forming apparatus 101 stores, as device capability information, drawing object layout and type information which makes a processing load higher in rendering and interpretation methods employed by the image forming apparatus 101 itself and then provides the device capability information to the client terminal 102 is employed. However, a configuration in which the image forming apparatus 101 does not select and set, as device capability information, drawing object layout and type information which makes a processing load higher but communicates the rendering and interpretation methods employed by the image forming apparatus 101 to the client terminal 102 is considerable. In that case, the client terminal 102 discriminating drawing object layout and type information which makes a processing load higher, based on information about rendering and interpretation methods included in the device capability information, and estimating a processing load enables attaining an advantageous effect similar to that in the first exemplary embodiment.

Accordingly, a second exemplary embodiment is directed to a configuration in which information about rendering and interpretation methods is stored in the device capability information, drawing object layout and type information which makes a processing load higher is discriminated based on the stored information, and a processing load is estimated based on the discriminated information.

<Flowchart of Device Capability Calculation Processing>

Figure 14:
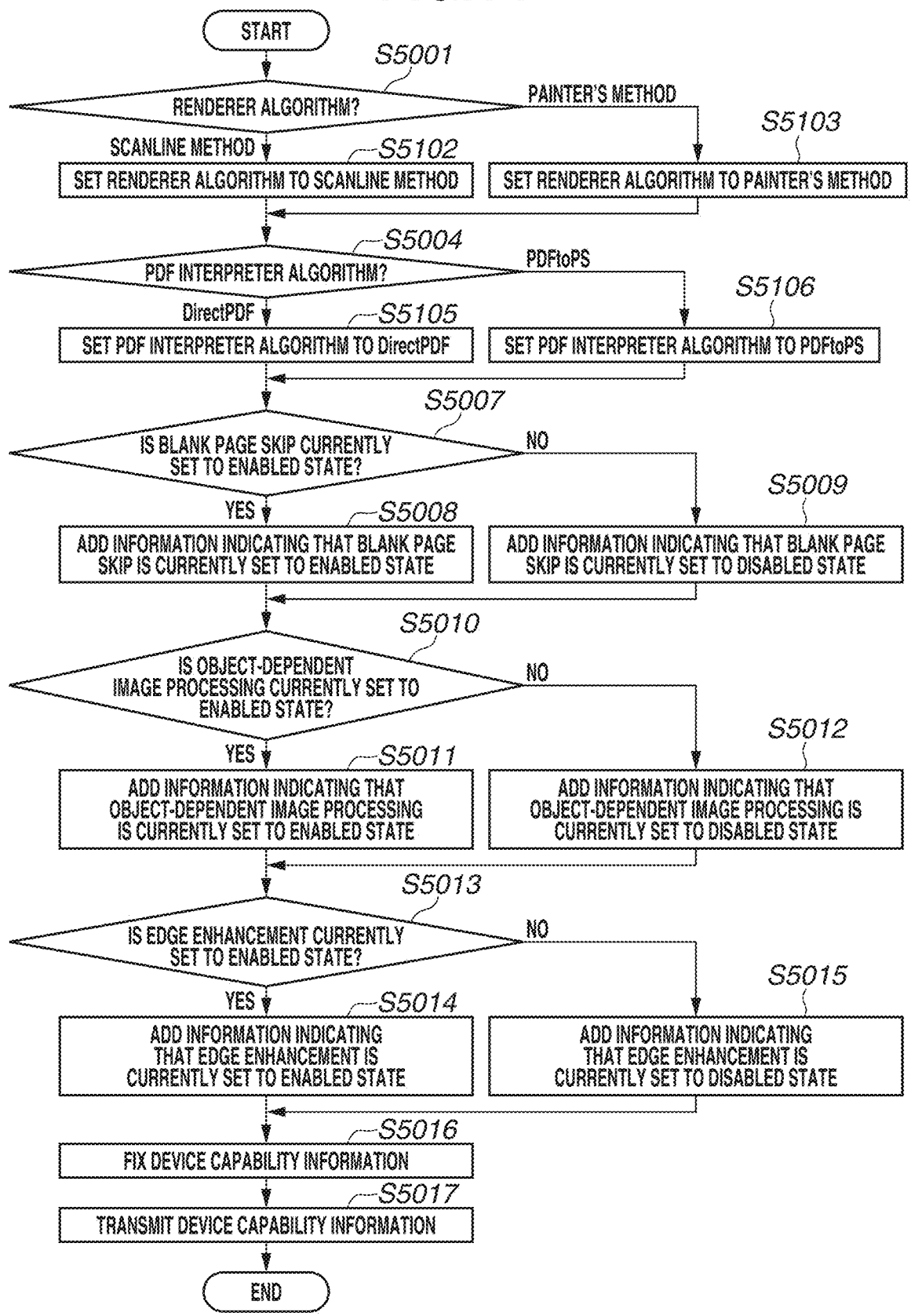
FIG. 14 is a flowchart illustrating device capability calculation processing which the image forming apparatus performs in the second exemplary embodiment.

First, processing described in FIG. 14, which is performed instead of the processing described in FIG. 11 in the first exemplary embodiment, is described.

FIG. 14 is a flowchart illustrating processing which the image forming apparatus 101 performs to set device capability to be communicated to the client terminal 102. When the image forming apparatus 101 receives a device capability transmission request from the client terminal 102, the present flow starts. The processing described in FIG. 14 is implemented by the central processing unit 201 executing a program stored in at least one of the main storage unit 202 and the auxiliary storage unit 203. Furthermore, steps similar to those illustrated in FIG. 11 are assigned the respective same step numbers as those illustrated in FIG. 11.

In step S5001, the capability information management unit 405 determines which of the scanline method and the painter's method the rendering method employed by the image forming apparatus 101 itself is. If it is determined that the rendering method is the scanline method (SCANLINE METHOD in step S5001), the capability information management unit 405 advances the processing to step S5102. If it is determined that the rendering method is the painter's method (PAINTER'S METHOD in step S5001), the capability information management unit 405 advances the processing to step S5103.

In step S5102, the capability information management unit 405 sets, to device capability, rendering method information indicating that the rendering method is the scanline method.

In step S5103, the capability information management unit 405 sets, to device capability, rendering method information indicating that the rendering method is the painter's method.

In step S5004, the capability information management unit 405 determines which of the PDFtoPS method and the DirectPDF method the interpretation method employed by the image forming apparatus 101 itself is. If it is determined that the interpretation method is the DirectPDF method (DirectPDF in step S5004), the capability information management unit 405 advances the processing to step S5105. If it is determined that the interpretation method is the PDFtoPS method (PDFtoPS in step S5004), the capability information management unit 405 advances the processing to step S5106.

In step S5105, the capability information management unit 405 sets an interpreter algorithm included in the device capability to DirectPDF.

In step S5106, the capability information management unit 405 sets an interpreter algorithm included in the device capability to PDFtoPS.

Processing operations in steps S5007 to S5017 are similar to those illustrated in FIG. 11 and are, therefore, omitted from description.

Thus far is the device capability calculation processing which is performed by the image forming apparatus 101 in the second exemplary embodiment.

In step S1003 in the device search processing illustrated in FIG. 7, the client terminal 102 receives the device capability generated in the processing illustrated in FIG. 14 and stores the received device capability in a table illustrated in FIG. 15A.

The table illustrated in FIG. 15A is a table in which the rendering and interpretation methods employed by the image forming apparatus 101 are stored as items of a renderer algorithm and a PDF interpreter algorithm, respectively, for each printer name.

<Flowchart of PDF Load Analysis Processing>

A flow of PDF load analysis processing which is performed by the client terminal 102 in the second exemplary embodiment is described with reference to FIG. 13. In the second exemplary embodiment, the device capability information received from the image forming apparatus 101 includes information indicating what each of the rendering and interpretation methods is and does not include drawing object layout and type information which makes a processing load higher. Therefore, the client terminal 102 sets drawing object layout and type information which makes a processing load higher, based on the device capability communicated from the image forming apparatus 101. Here, steps similar to those illustrated in FIG. 9 are assigned the respective same step numbers as those illustrated in FIG. 9, and processing operations similar to those described in FIG. 9 are omitted from description.

Figure 13:
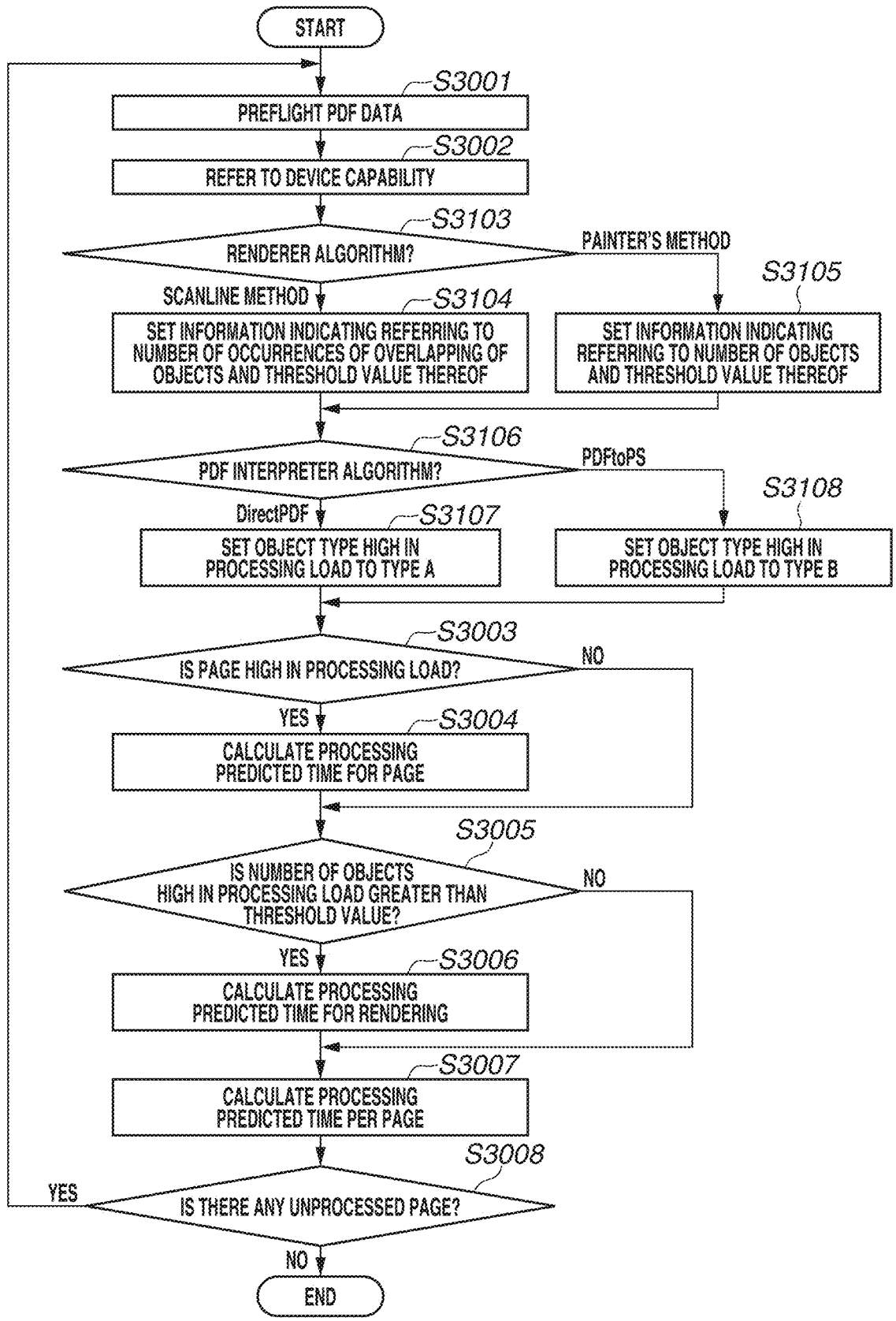
FIG. 13 is a flowchart illustrating PDF load analysis processing which the client terminal performs in the second exemplary embodiment.

Furthermore, processing described in FIG. 13 is implemented by the central processing unit 301 executing a program stored in the main storage unit 302 or the auxiliary storage unit 303.

When the client terminal 102 receives a printing instruction from the user, the present flow starts.

In step S3002, the processing load calculation unit 504 refers to device capability information about an image forming apparatus serving as a print job inputting destination acquired in the device search processing illustrated in FIG. 7. The processing load calculation unit 504 refers to the table illustrated in FIG. 15A and identifies the renderer algorithm.

In step S3103, the processing load calculation unit 504 determines which of the scanline method and the painter's method the rendering method employed by the image forming apparatus 101 serving as an inputting destination is. If it is determined that the rendering method is the scanline method (SCANLINE METHOD in step S3103), the processing load calculation unit 504 advances the processing to step S3104. If it is determined that the rendering method is the painter's method (PAINTER'S METHOD in step S3103), the processing load calculation unit 504 advances the processing to step S3105.

In step S3104, the processing load calculation unit 504 sets using the number of occurrences of overlapping of objects included in one page as a parameter for determining a processing load in rendering processing and a threshold value thereof. In step S3105, the processing load calculation unit 504 sets using the number of objects included in one page as a parameter for determining a processing load in rendering processing and a threshold value thereof. In steps S3104 and S3105, the processing load calculation unit 504 refers to a previously stored table illustrated in FIG. 15B and determines a parameter used for determining a processing load and a threshold value thereof. In the table illustrated in FIG. 15B, parameters used for determining whether a processing load is high for each rendering method and threshold values thereof are stored.

In step S3106, the processing load calculation unit 504 determines which of the PDFtoPS method and the DirectPDF method the interpretation method employed by the image forming apparatus 101 serving as an inputting destination is. If it is determined that the interpretation method is the DirectPDF method (DirectPDF in step S3106), the processing load calculation unit 504 advances the processing to step S3107. If it is determined that the interpretation method is the PDFtoPS method (PDFtoPS in step S3106), the processing load calculation unit 504 advances the processing to step S3108.

In step S3107, the processing load calculation unit 504 sets an ICCBased color space object with a transparency attribute as an object type high in processing load for interpretation processing. Additionally, in step S3107, the processing load calculation unit 504 sets a threshold value used for determining whether the processing load is high. Furthermore, in the flowchart of FIG. 13, an ICCBased color space object with a transparency attribute is described as "TYPE A". In step S3108, the processing load calculation unit 504 sets an object with a transparency attribute or an ICCBased color space object as an object type high in processing load for interpretation processing. Additionally, in step S3108, the processing load calculation unit 504 sets a threshold value used for determining whether the processing load is high. Furthermore, in the flowchart of FIG. 13, an object with a transparency attribute or an ICCBased color space object is described as "TYPE B". Processing operations in steps S3107 and S3108 are performed based on a previously stored table illustrated in FIG. 15C.

Processing operations in steps S3003 to S3008 are similar to those described in the first exemplary embodiment and are, therefore, omitted from description.

Thus far is the PDF load analysis processing which is performed by the client terminal 102 in the second exemplary embodiment.

According to the first exemplary embodiment and the second exemplary embodiment described above, the format of print data can be controlled in such a manner that printing is able to be performed without an image forming apparatus performing processing high in processing load.

In the above-described first exemplary embodiment and second exemplary embodiment, the client terminal 102 calculates a load factor which would occur when the image forming apparatus 101 processes image data of the PDF format generated by the client terminal 102 and, when determining that the processing load is high in the image forming apparatus 101, the client terminal 102 converts image data of the PDF format into a raster image. In a third exemplary embodiment, a method of readily determining whether to perform conversion into a raster image is described. In the third exemplary embodiment, the client terminal 102 acquires, as device capability, layout information about objects high in processing load and information about object types high in processing load from the image forming apparatus 101. In a case where the generated image data of the PDF format satisfies an object layout high in processing load or includes an object of the type high in processing load, the client terminal 102 converts the image data of the PDF format into image data of the raster format. Furthermore, the contents illustrated in FIG. 1 to FIG. 7, FIG. 11, and FIGS. 12A and 12B are similar to those described in the first exemplary embodiment and are, therefore, omitted from description here.

Figure 16:
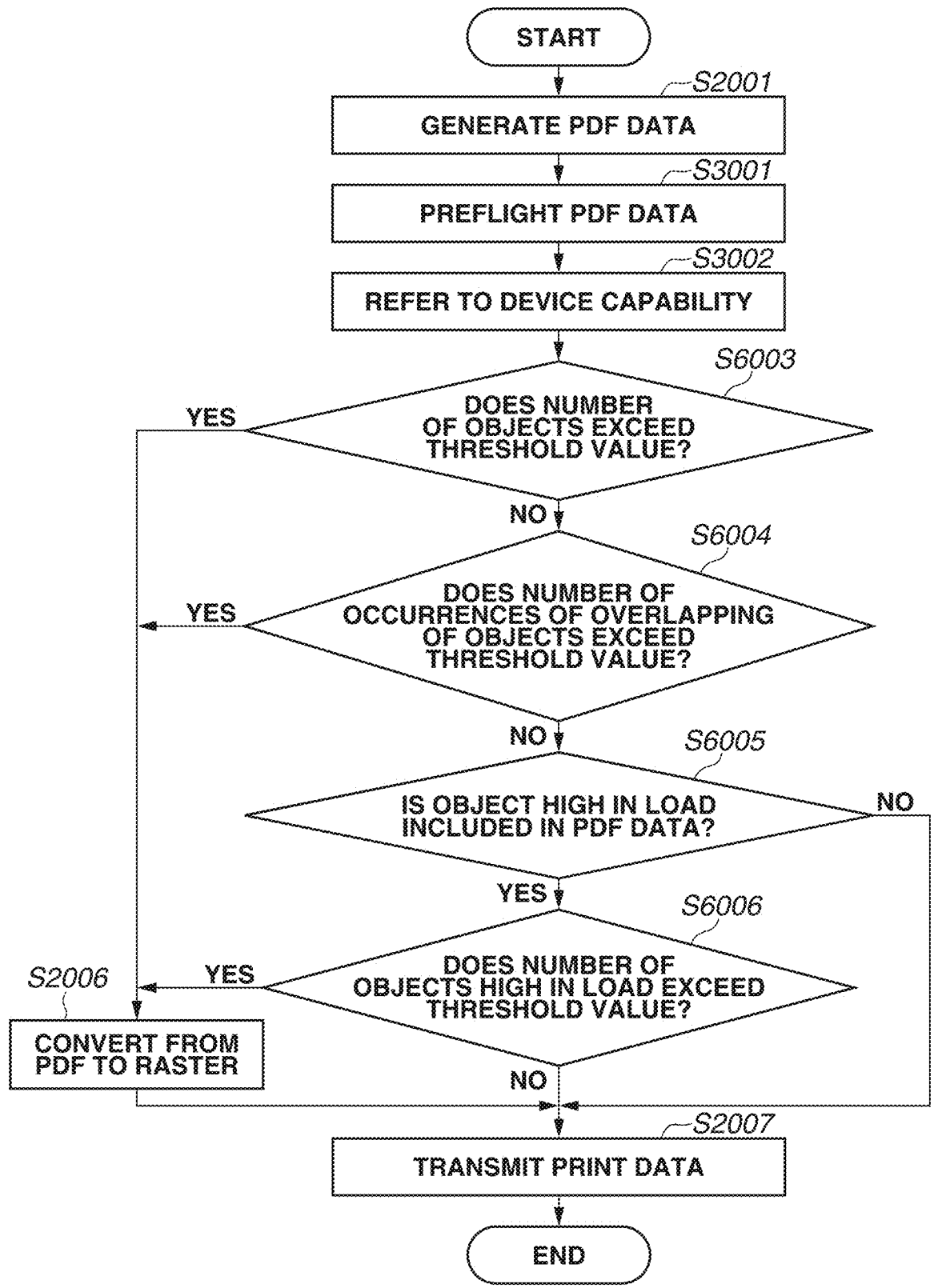
FIG. 16 is a flowchart illustrating processing which the client terminal performs in a third exemplary embodiment.

FIG. 16 is a flowchart illustrating processing which the client terminal 102 performs in the third exemplary embodiment. The processing described in FIG. 16 is implemented by the central processing unit 301 executing a program stored in at least one of the main storage unit 302 and the auxiliary storage unit 303 of the client terminal 102. Furthermore, steps similar to those illustrated in FIG. 8 and FIG. 9 are assigned the respective same step numbers as those illustrated in FIG. 8 and FIG. 9, and processing operations similar to those described in FIG. 8 and FIG. 9 are omitted from description. Furthermore, in the preflight processing in step S3001, with respect to each page of the generated PDF data, the processing load calculation unit 504 acquires the types of included objects, the number of included objects, and the number of occurrences of overlapping of objects.

In step S6003, the processing load calculation unit 504 determines whether the number of objects included in one page of the PDF data exceeds a threshold value designated by device capability. If, in step S6003, a parameter used for determining a processing load is the number of objects included in one page and it is determined that there is a page in which the number of objects included in the page exceeds the threshold value (YES in step S6003), the processing load calculation unit 504 advances the processing to step S2006. If, in step S6003, a criterion for a processing load is the number of objects included in one page and it is determined that the number of objects included in one page is less than or equal to the threshold value (NO in step S6003), the processing load calculation unit 504 advances the processing to step S6004. Furthermore, in a case where, in the device capability, the number of occurrences of overlapping of objects is designated as a parameter used for determining a processing load, the processing load calculation unit 504 advances the processing to step S6004 without performing processing for comparing the number of objects included in one page with the threshold value. Moreover, the threshold value to be used in step S6003 can be "1".

In step S6004, the processing load calculation unit 504 determines whether the number of occurrences of overlapping of objects per page of the PDF data exceeds a threshold value. If, in step S6004, the number of occurrences of overlapping of objects per page is designated as a parameter used for determining a processing load and it is determined that there is a page in which the number of occurrences of overlapping of objects per page exceeds the threshold value (YES in step S6004), the processing load calculation unit 504 advances the processing to step S2006. If, in step S6004, the number of occurrences of overlapping of objects per page is designated as a parameter used for determining a processing load and it is determined that the number of occurrences of overlapping of objects per page is less than or equal to the threshold value (NO in step S6004), the processing load calculation unit 504 advances the processing to step S6005. Furthermore, in a case where, in the device capability acquired from the image forming apparatus 101, the number of objects is designated as a parameter used for determining a processing load, the processing load calculation unit 504 advances the processing to step S6005 without performing processing described in step S6004.

Next, in step S6005, the processing load calculation unit 504 determines whether an object of the type designated as an object high in processing load in the device capability is included in the PDF data. If it is determined that a drawing command corresponding to an object high in processing load is included in the PDF data (YES in step S6005), the processing load calculation unit 504 advances the processing to step S6006. If it is determined that no object of the type high in processing load is included in the PDF data (NO in step S6005), the processing load calculation unit 504 advances the processing to step S2007.

In step S6006, the processing load calculation unit 504 determines whether the number of objects of types high in processing load included in one page exceeds a threshold value. If it is determined that the number of objects of types high in processing load included in one page exceeds the threshold value (YES in step S6006), the processing load calculation unit 504 advances the processing to step S2006. If it is determined that the number of objects of types high in processing load included in one page is less than or equal to the threshold value (NO in step S6006), the processing load calculation unit 504 advances the processing to step S2007. Furthermore, the threshold value to be used here can also be "1". In the third exemplary embodiment, after, in step S6005, determining whether an object high in a processing load which would occur in the image forming apparatus is included in PDF data, the client terminal 102 determines whether the number of such objects exceeds a threshold value. A configuration in which, without performing the determination in step S6006, if an object high in processing load is included in the PDF data, regardless of the number of such objects, the client terminal 102 advances the processing to step S2006 can be employed.

With the above-described processing performed, in a case where there is a possibility that it takes a long time to perform interpretation processing and rendering processing in the image forming apparatus 101, the client terminal 102 performs up to rasterizing processing and then transmits a raster image to the image forming apparatus 101.

Furthermore, in the third exemplary embodiment, unlike the first and second exemplary embodiments, setting analysis processing of an image forming apparatus, which is to be performed before conversion processing into a raster image, is not performed. The client terminal 102 can also be configured to perform the processing described in step S2004 illustrated in FIG. 8 before performing conversion into the raster format in step S2006 and determine whether to perform conversion into the raster format depending on a result of the processing obtained in step S2004. Moreover, in the third exemplary embodiment, the client terminal 102 can also be configured to, without performing processing in steps S6004 and S6005, perform only processing in steps S6005 and S6006. In the case of this configuration, if, regardless of whether it takes a long time to perform interpretation processing in the image forming apparatus, it takes a long time to perform rendering processing in the image forming apparatus, the client terminal 102 performs rendering processing. Moreover, in the third exemplary embodiment, in step S6005, the client terminal 102 determines whether an object of the type high in processing load is included in PDF data. Then, if it is determined that an object of the type high in processing load is included in PDF data, the client terminal 102 determines whether the number of objects of the type high in processing load exceeds a threshold value. A configuration in which, in a case where, in step S6005, it is determined that an object of the type high in processing load is included in PDF data, regardless of the number of such objects, the client terminal 102 advances the processing to step S2006 can also be employed. Furthermore, in the above-mentioned case, as long as including object types high in a processing load which would occur in an image forming apparatus, the device capability does not necessarily need to include a threshold value.

As described above, the third exemplary embodiment enables, without performing calculation of a load factor or a processing time per page, switching whether to perform rasterizing processing in a client terminal, based on the layout and number of objects included in PDF data.

In the above-described exemplary embodiments, an example in which, in the case of drawing processing which is time-consuming when being performed by image processing, the client terminal performs the image processing has been described. Processing operations transmitted from the client terminal may include a processing operation which the image forming apparatus is not able to perform, so that the image forming apparatus may convert the received processing operation into a different processing operation and then perform the different processing operation. If the image forming apparatus performs an alternative processing operation, a drawing processing operation which differs from a drawing operation intended in the client terminal may be performed. Therefore, the fourth exemplary embodiment is directed to preventing or reducing a drawing instruction according to which the image forming apparatus may perform alternative processing from being included in print data transmitted from the client terminal.

In the fourth exemplary embodiment, an example of focusing on not a drawing processing load but an image quality is described.

Figure 17A:
FIGS. 17A, 17B, and 17C are diagrams each illustrating an example of alternative processing which the image forming apparatus performs in a fourth exemplary embodiment.
Figure 17B:
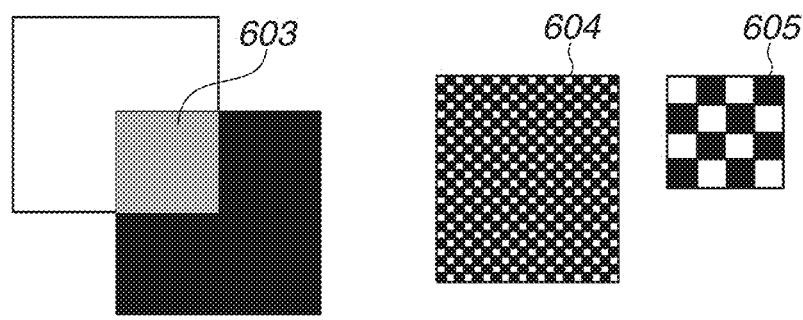
Figure 17C:
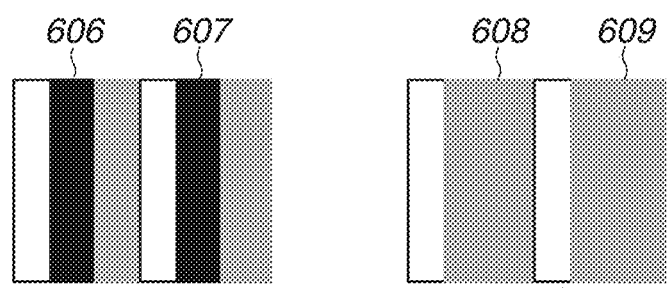

Due to, for example, restrictions on mounted hardware of the image forming apparatus, the image forming apparatus substitutes a specific image processing function with a different processing operation and then performs the different processing operation. FIGS. 17A, 17B, and 17C are diagrams each illustrating an example of alternative processing which the image forming apparatus performs as mentioned above.

FIG. 17A is a diagram illustrating alternative processing which the image forming apparatus performs in a case where an instruction for causing the image forming apparatus to draw characters of a font which is not loaded on the image forming apparatus is included in PDF data which is the received print data. Here, the image forming apparatus performs alternative processing for substituting drawing of characters of a font not loaded on the image forming apparatus with drawing of characters of another font loaded on the image forming apparatus.

A character string 601 (Japanese characters meaning "fiscal year (Heisei era)") illustrated in FIG. 17A indicates a result of drawing in which PDF data is displayed with a designated font. On the other hand, a character string 602 indicates a result of drawing obtained by alternative processing which is performed with a font loaded on the image forming apparatus. In the character string 602 obtained by alternative processing, marks indicating parentheses included in the character string "年度 (平成)" overlap characters "平成" included in the character string 602. This occurs in a case where the image forming apparatus has rasterized characters of a proportional font, in which the character width varies by character, included in PDF data with a monospaced font, in which the character width is fixed. In PDF data, a drawing start position of each character may be designated. At this time, the drawing start position of each character included in PDF data is set based on a font width used when the PDF data has been generated. However, if a font which the image forming apparatus uses to perform font rasterization is changed, since the width used for drawing marks such as parentheses becomes different from that used at the time of generation of PDF data, as illustrated in FIG. 17A, a phenomenon in which characters and marks overlap occurs. In a case where a font on which the image forming apparatus may perform font substitution processing is included in PDF data which the client terminal transmits to the image forming apparatus, the client terminal converts the PDF data into raster data and then transmits the raster data to the image forming apparatus.

FIG. 17B is a diagram illustrating an example of alternative processing which the image forming apparatus performs when drawing a transparent object. Normally, transparency processing includes applying a designated color profile to color values of an object located on the front side and color values of an object located on the back side to perform color conversion thereon and then performing transparency composition processing on the objects based on a transparency degree.

However, since color spaces which PDF supports include various color spaces such as a Device color space, an ICCBased color space, and a Special color space, there is a case where the image forming apparatus is not equipped with transparency processing associated with a color space of the received print data. Therefore, the image forming apparatus may perform, instead of transparency processing, processing for drawing, for example, a pattern 604.

FIG. 17B illustrates a case where a transparency attribute of 50% is designated to a region 603 in which a white rectangle and a black rectangle partially overlap. To attain a transparent expression in a pseudo manner, the image forming apparatus arranges white rectangles and black rectangles in a checkerboard pattern as in the pattern 604. A part 605 is an enlarged part of the pattern 604. The image forming apparatus sets the ratio of arrangement between white rectangles and black rectangles to 50:50, thus reproducing a transparent expression of 50% in a pseudo manner. The image forming apparatus is able to change the rate of transparency in a pseudo manner by using a pattern image obtained by varying the ratio between white rectangles and black rectangles. In a case where print processing is performed by an image forming apparatus which employs such pseudo-transparency processing, it is desirable in terms of image quality that the client terminal appropriately perform transparency composition processing on print data and thus transmit the processed print data in a raster format to the image forming apparatus.

FIG. 17C illustrates an example of a case where an object with a spot color designated thereto is color-converted with an alternative color space. The spot color is a color designated by a special color designation other than cyan (C), magenta (M), yellow (Y), and black (K) colors, which are process colors. For example, the spot color is a glossy color such as gold or silver.

In an image forming apparatus which does not have the function of processing for reproducing a spot color with colors which are able to be output by the image forming apparatus, processing for reproducing the spot color is substituted with alternative processing using color conversion in a specific default color space. Such an image forming apparatus performs specific color conversion processing on signal values of C, M, Y, and K designated in association with the spot color, thus determining C, M, Y, and K values to be output.

FIG. 17C illustrates objects with a spot color designated thereto and results of alternative processing. There are illustrated objects 606 and 607 with a spot color designated thereto. There are also illustrated objects 608 and 609 subjected to alternative processing for substituting the objects 606 and 607 with the 608 and 609. As can be seen from the objects 608 and 609, a difference in color from the other adjacent objects may be lost. Therefore, in the case of printing PDF data including a spot color, it is desirable in terms of image quality that the client terminal appropriately perform spot color matching processing on the PDF data and then input the processed data in the raster format to the image forming apparatus.

The fourth exemplary embodiment is configured to switch whether to employ the PDF format or the raster format as a data format of print data, depending on the presence of absence of an object associated with image quality.

<Flowchart of Device Capability Generation Processing>

Figure 6:
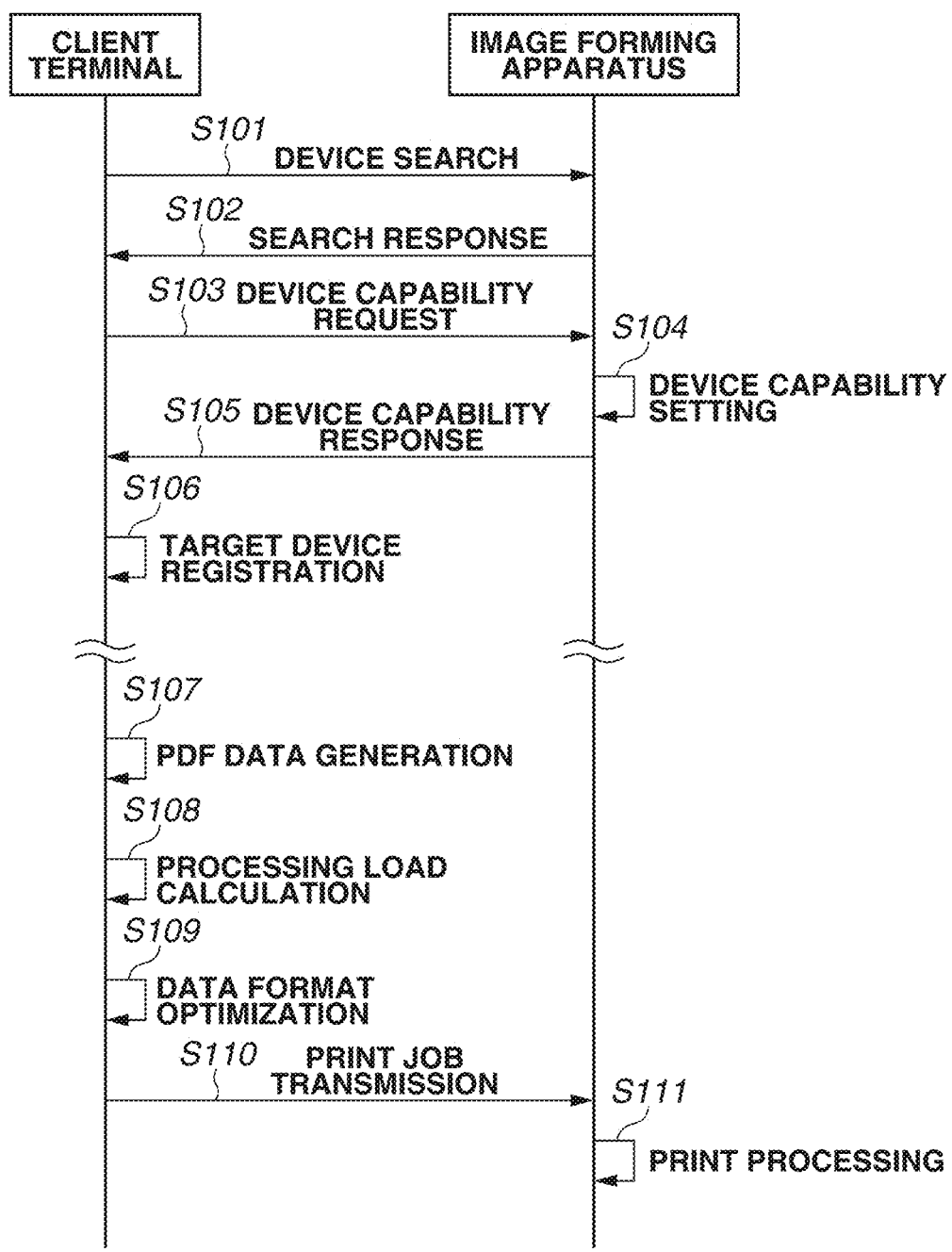
FIG. 6 is a sequence diagram illustrating a series of processing operations starting with searching for an image forming apparatus and ending with printing in the first exemplary embodiment.

Even in the fourth exemplary embodiment, a sequence starting with the client terminal searching for an image forming apparatus and ending with the image forming apparatus performing printing is almost similar to that illustrated in FIG. 6. The device capability setting in step S104 illustrated in FIG. 6 is replaced with processing illustrated in FIG. 18 and the processing load calculation in step S108 is replaced with processing illustrated in FIG. 21.

First, processing which the image forming apparatus performs to generate device capability in the fourth exemplary embodiment is described with reference to FIG. 18. The present flowchart is started based on the image forming apparatus 101 receiving an acquisition request for device capability from the client terminal 102. Moreover, the processing illustrated in FIG. 18 is implemented by the central processing unit 201 executing a program stored in the main storage unit 202 or the auxiliary storage unit 203. Furthermore, steps similar to those illustrated in FIG. 14 are assigned the respective same step numbers as those illustrated in FIG. 14, and processing operations similar to those described in FIG. 14 are omitted from description.

In step S9001, the capability information management unit 405 determines whether the image forming apparatus 101 is an apparatus which performs alternative spot color processing for alternatively processing an object with a spot color designated thereto by a default color space. If it is determined that the image forming apparatus 101 is an apparatus which performs the alternative spot color processing (YES in step S9001), the capability information management unit 405 advances the processing to step S9002. If it is determined that the image forming apparatus 101 is an apparatus which does not perform the alternative spot color processing (NO in step S9001), the capability information management unit 405 advances the processing to step S9003. Furthermore, whether each image forming apparatus performs processing for converting a spot color by a default color space can be previously set for each model of image forming apparatus or can be configured to be able to be set by the user as device setting.

In step S9002, the capability information management unit 405 additionally sets, to device capability, an alternative spot color as an item which the image forming apparatus 101 itself performs as alternative processing.

In step S9003, the capability information management unit 405 determines whether the image forming apparatus 101 is an apparatus which alternatively processes an object with transparency designated thereto as pseudo-transparency processing. If it is determined that the image forming apparatus 101 is an apparatus which performs the pseudo-transparency processing (YES in step S9003), the capability information management unit 405 advances the processing to step S9004. If it is determined that the image forming apparatus 101 is an apparatus which does not perform the pseudo-transparency processing (NO in step S9003), the capability information management unit 405 advances the processing to step S9005. Furthermore, whether each image forming apparatus performs alternative processing for substituting a transparent object with a pattern image can be configured to be previously set for each model of image forming apparatus or can be configured to be able to be set by the user after shipment of the image forming apparatus.

In step S9004, the capability information management unit 405 additionally sets, to the device capability, pseudo-transparency processing as an item which the image forming apparatus 101 itself performs as alternative processing.

In step S9005, the capability information management unit 405 determines whether the image forming apparatus 101 is an apparatus which performs alternative substitution processing for substituting an object of a non-embedded font with a printer built-in font. If it is determined that the image forming apparatus 101 is an apparatus which performs the alternative substitution processing (YES in step S9005), the capability information management unit 405 advances the processing to step S9006. If it is determined that the image forming apparatus 101 is an apparatus which does not perform the alternative substitution processing (NO in step S9005), the capability information management unit 405 advances the processing to step S5016. Furthermore, whether each image forming apparatus performs alternative processing for substituting a predetermined font included in PDF data with a font stored in the image forming apparatus can be previously set for each model of image forming apparatus or can be configured to be able to be set by the user.

In step S9006, the capability information management unit 405 additionally sets, to the device capability, the font alternative substitution processing using a printer built-in font as an item which the image forming apparatus 101 itself performs as alternative processing. Furthermore, in step S9006, the capability information management unit 405 additionally sets, to the device capability, information indicating a font targeted for alternative processing.

Processing operations in steps S5016 and S5017 are similar to those illustrated in FIG. 14.

Thus far is the device capability calculation processing which is performed by the image forming apparatus 101 in the fourth exemplary embodiment.

Furthermore, in the fourth exemplary embodiment, the processing described in FIG. 18 starts based on the image forming apparatus 101 receiving an acquisition request for device capability from the client terminal 102. The processing described in FIG. 18 can be configured to be performed on a periodic basis or can be configured to be performed at predetermined timing, such as timing of powering-on of the image forming apparatus or timing of return from sleep of the image forming apparatus.

<Device Capability Information Table>

Next, the data structure of a device capability information table in the fourth exemplary embodiment is described with reference to FIG. 19. The table illustrated in FIG. 19 is a table used for the client terminal 102 to manage device capability received from the image forming apparatus 101.

The device capability information table illustrated in FIG. 19 is a table which is managed in a list form for respective printer names of image forming apparatuses and in which information to be referred to for determining whether each forming apparatus is a device what alternative processing which performs is stored.

The column "Printer Name" indicates the name of an image forming apparatus which transmitted device capability. "Printer Name" can be, for example, an identification number specific to each image forming apparatus. The column "Alternative Processing" indicates alternative processing which each image forming apparatus performs for each function.

In the example illustrated in FIG. 19, information indicating that "Printer A" performs "font alternative", "pseudo-transparency processing", and "alternative spot color" as alternative processing is stored. Additionally, information indicating that, in a case where rasterizing character codes by "Font A" is described in PDF data, "Printer A" rasterizes the character codes by another font is stored.

Similarly, information indicating that "Printer B" performs "font alternative" and "alternative spot color" as alternative processing and "Printer C" performs "pseudo-transparency processing" and "alternative spot color" as alternative processing is shown in the table.

The client terminal 102 refers to information about alternative processing included in the device capability and determines which of the PDF format and the raster format to use as a print data format. The client terminal 102 performs this determination based on whether, if the alternative processing is "font alternative", there is a non-embedded font object, if the alternative processing is "pseudo-transparency processing", there is an object with a transparency attribute designated thereto, and, if the alternative processing is "alternative spot color", there is an object with a spot color designated thereto.

<Flowchart of Print Data Optimization Processing>

Next, optimization processing for print data which the client terminal 102 performs when receiving a printing instruction in the fourth exemplary embodiment is described with reference to FIG. 20. Upon receiving a printing instruction from the user, the client terminal 102 generates print data of the PDF format. The client terminal 102 determines whether there is not an object to be subjected to alternative processing, based on a drawing object structure of the converted PDF data and the device capability information. When determining that there is an object to be subjected to alternative processing, the client terminal 102 converts PDF data into the raster format and then transmits the raster data to the image forming apparatus.

Figure 20:
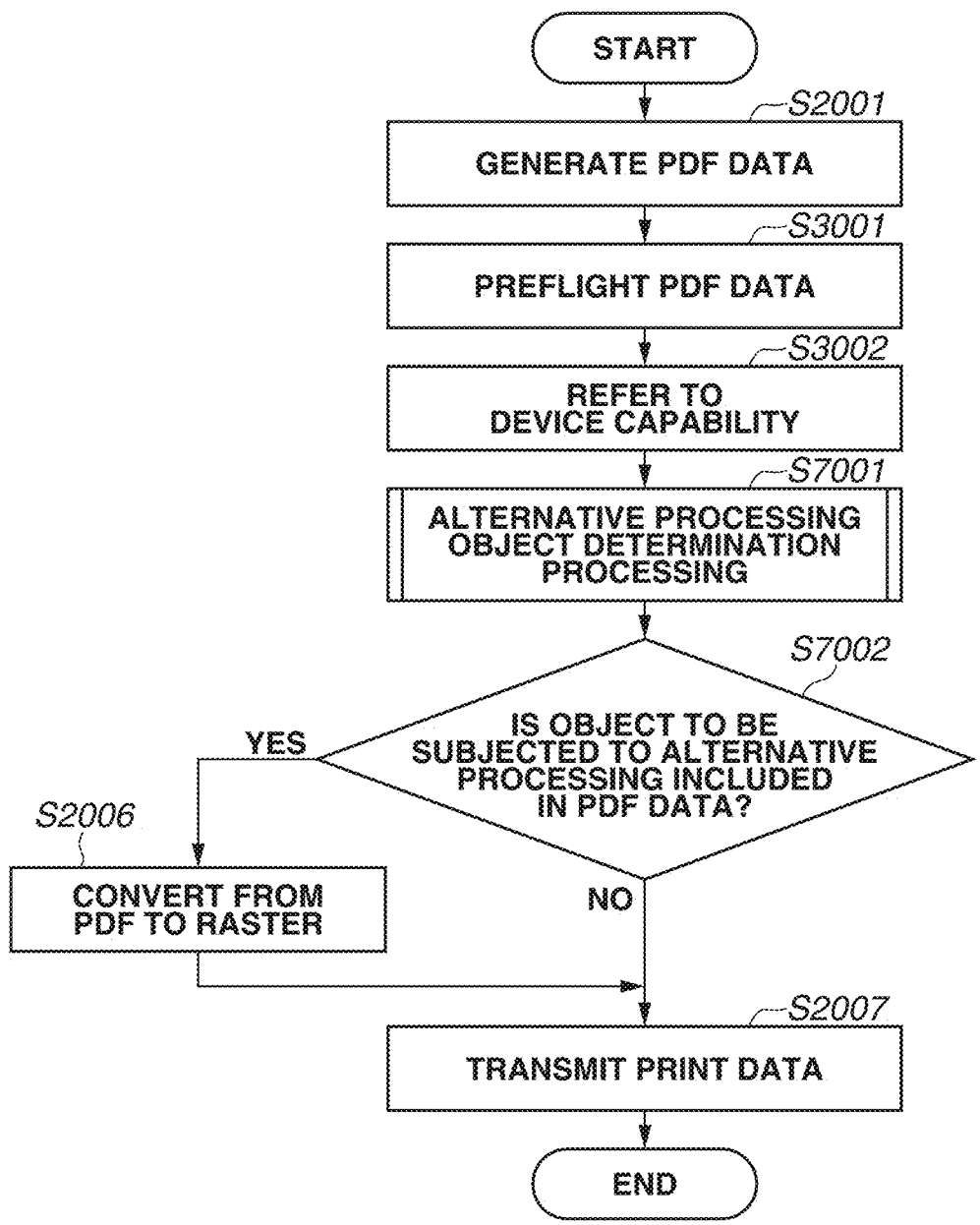
FIG. 20 is a flowchart illustrating processing which the client terminal performs in the fourth exemplary embodiment.

A program for performing processing described in the flowchart of FIG. 20 is stored in the main storage unit 302 or the auxiliary storage unit 303, and the processing is implemented by the central processing unit 301 executing the program.

When the client terminal 102 receives a printing request from the user, the present flow starts. Furthermore, steps similar to those illustrated in FIG. 8 and FIG. 9 are assigned the respective same step numbers as those illustrated in FIG. 8 and FIG. 9, and processing operations similar to those described in FIG. 8 and FIG. 9 are omitted from description.

Processing operations in steps S2001 and S2006 are similar to those illustrated in FIG. 8.

Processing operations in steps S3001 and S3002 are similar to those illustrated in FIG. 9.

In step S7001, the processing load calculation unit 504 performs determination processing for determining whether an object which would be subjected to alternative processing by an image forming apparatus is included in the generated PDF data. Details of the determination processing are described below with reference to FIG. 21.

In step S7002, the processing load calculation unit 504 refers to a result of the determination obtained in step S7001 and determines whether there is an object to be subjected to alternative processing in the PDF data. If it is determined that there is an object to be subjected to alternative processing (YES in step S7002), the processing load calculation unit 504 advances the processing to step S2006. In step S2006, the client terminal 102 performs processing for converting the generated PDF data into raster data. If it is determined that there is no object to be subjected to alternative processing (NO in step S7002), the processing load calculation unit 504 advances the processing to step S2007. In this case, the client terminal 102 directly transmits the generated PDF data to the image forming apparatus.

A processing operation in step S2007 is similar to that illustrated in FIG. 8.

Figure 21:
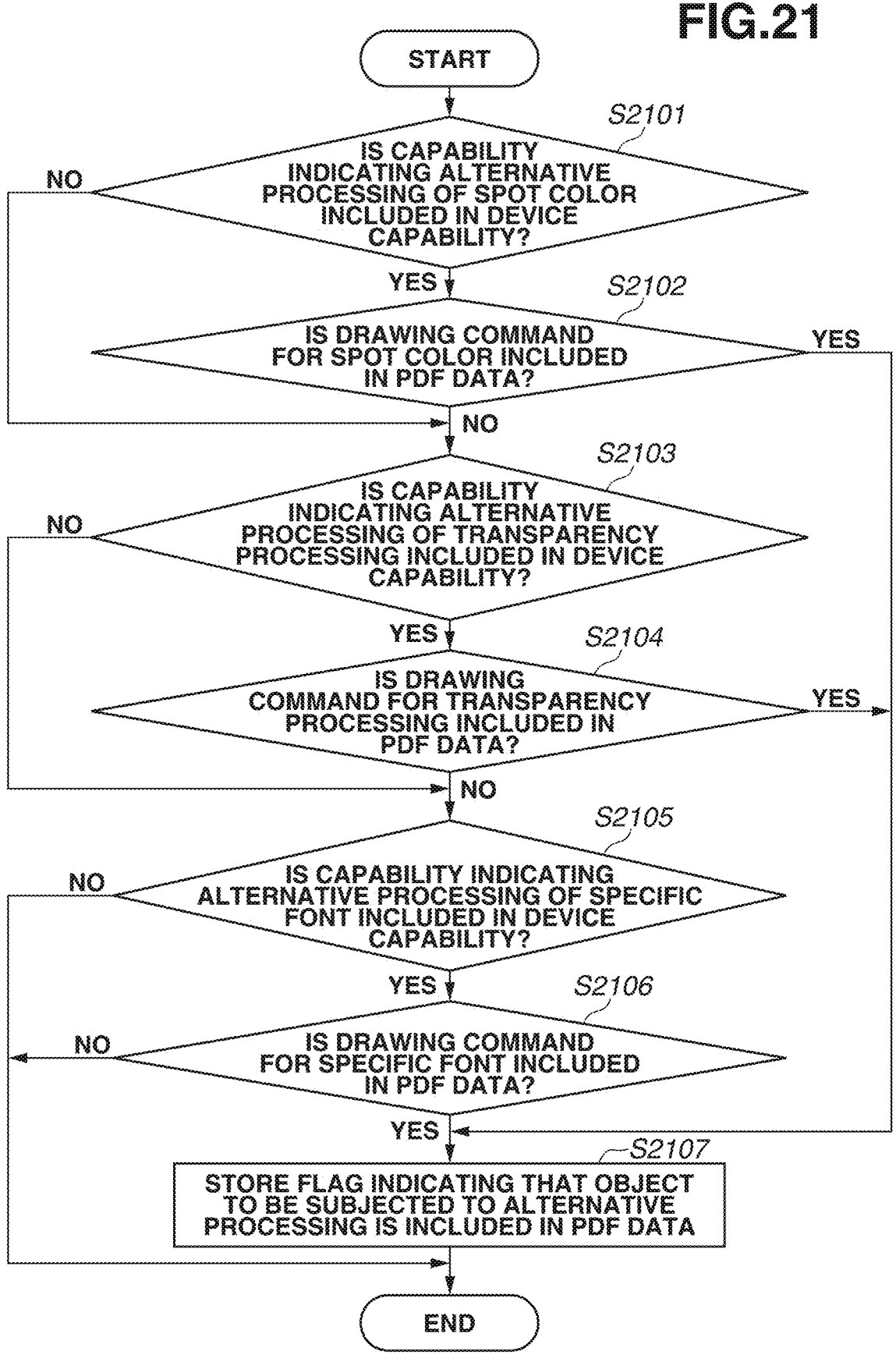
FIG. 21 is a flowchart illustrating an example of processing which the client terminal performs to determine whether to perform format conversion in the fourth exemplary embodiment.

FIG. 21 is a flowchart illustrating processing which the processing load calculation unit 504 performs in step S7001 illustrated in FIG. 20.

A program for performing processing described in the flowchart of FIG. 21 is stored in the main storage unit 302 or the auxiliary storage unit 303, and the processing is implemented by the central processing unit 301 executing the program.

In step S2101, the processing load calculation unit 504 refers to device capability of an image forming apparatus serving as a transmission destination of image data and determines whether capability indicating alternative processing for substituting spot color conversion processing with another type of conversion processing is included in the device capability. For example, in a case where the image forming apparatus to be used for printing is "Printer A", the processing load calculation unit 504 refers to the table illustrated in FIG. 19 and determines whether "alternative spot color" is included in the alternative processing for "Printer A". If it is determined that capability indicating alternative processing for substituting spot color conversion processing with another type of conversion processing is included in the device capability (YES in step S2101), the processing load calculation unit 504 advances the processing to step S2102. If it is determined that capability indicating alternative processing for substituting spot color conversion processing with another type of conversion processing is not included in the device capability (NO in step S2101), the processing load calculation unit 504 advances the processing to step S2103.

In step S2102, the processing load calculation unit 504 determines whether an object with a spot color designated thereto is included in the PDF data generated in step S2001. The processing load calculation unit 504 refers to the PDF data and determines whether characters or graphics with a spot color designated thereto are included in the PDF data. If it is determined that an object with a spot color designated thereto is included in the PDF data (YES in step S2102), the processing load calculation unit 504 advances the processing to step S2107. If it is determined that no object with a spot color designated thereto is included in the PDF data (NO in step S2102), the processing load calculation unit 504 advances the processing to step S2103.

In step S2103, the processing load calculation unit 504 refers to device capability of an image forming apparatus serving as a transmission destination of image data and determines whether capability indicating alternative processing for substituting transparency processing with a pattern image is included in the device capability. For example, in a case where the image forming apparatus to be used for printing is "Printer A", the processing load calculation unit 504 refers to the table illustrated in FIG. 19 and determines whether "pseudo-transparency processing" is included in the alternative processing for "Printer A". If it is determined that capability indicating alternative processing for substituting transparency processing with a pattern image is included in the device capability (YES in step S2103), the processing load calculation unit 504 advances the processing to step S2104. If it is determined that capability indicating alternative processing for substituting transparency processing with a pattern image is not included in the device capability (NO in step S2103), the processing load calculation unit 504 advances the processing to step S2105.

In step S2104, the processing load calculation unit 504 determines whether an object with transparency processing designated thereto is included in the PDF data generated in step S2001. If it is determined that an object with transparency processing designated thereto is included in the PDF data (YES in step S2104), the processing load calculation unit 504 advances the processing to step S2107. If it is determined that no object with transparency processing designated thereto is included in the PDF data (NO in step S2104), the processing load calculation unit 504 advances the processing to step S2105.

In step S2105, the processing load calculation unit 504 refers to device capability of an image forming apparatus serving as a transmission destination of image data. Then, the processing load calculation unit 504 determines whether capability indicating alternative processing for rasterizing a specific font by another font which the image forming apparatus is able to rasterize is included in the referred-to device capability. For example, in a case where the image forming apparatus to be used for printing is "Printer A", the processing load calculation unit 504 refers to the table illustrated in FIG. 19 and determines whether "font alternative" is included in the alternative processing for "Printer A". If it is determined that capability indicating alternative processing for rasterizing a specific font by another font which the image forming apparatus is able to rasterize is included (YES in step S2105), the processing load calculation unit 504 advances the processing to step S2106. If it is determined that capability indicating alternative processing for rasterizing a specific font by another font which the image forming apparatus is able to rasterize is not included (NO in step S2105), the processing load calculation unit 504 ends the flow illustrated in FIG. 21.

In step S2106, the processing load calculation unit 504 determines whether an object with a specific font designated thereto is included in the PDF data generated in step S2001. The specific font is a font designated by the device capability. For example, in a case where the image forming apparatus to be used for printing is "Printer A", "Font A" which is designated by "font alternative" from among the items of alternative processing associated with "Printer A" illustrated in FIG. 19A is the specific font. Furthermore, the specific font can include one type of font or a plurality of types of fonts. If it is determined that an object with a specific font designated thereto is included in the PDF data (YES in step S2106), the processing load calculation unit 504 advances the processing to step S2107. If it is determined that no object with a specific font designated thereto is included in the PDF data (NO in step S2106), the processing load calculation unit 504 ends the flow illustrated in FIG. 21.

In step S2107, the processing load calculation unit 504 stores, in the auxiliary storage unit 303, a flag indicating that an object on which the image forming apparatus performs alternative processing is included in the PDF data. In step S7002 illustrated in FIG. 20, the processing load calculation unit 504 performs determination based on the flag stored in step S2107.

Thus far is the print data optimization processing which is performed by the client terminal 102 in the fourth exemplary embodiment. With the above-described processing performed, in a case where an object which would be subjected to alternative processing by an image forming apparatus is included in PDF data, the client terminal performs rasterizing processing.

Furthermore, in the above-described exemplary embodiments, when determining that a processing load is high, the client terminal 102 determines whether a setting in which it takes a long time to perform processing of data of the raster format is currently set to an image forming apparatus. A configuration in which, without performing such determination, when determining that a load on processing of data of the PDF format is high, the client terminal 102 performs conversion into the raster format can be employed.

In the above-described exemplary embodiments, the client terminal 102 acquires device capability from an image forming apparatus at timing of device search. The timing of acquisition of device capability is not limited to the above-mentioned timing. For example, a configuration in which, at timing when an image forming apparatus to be used for printing has been selected, the client terminal 102 acquires device capability from the selected image forming apparatus can be employed. Moreover, the client terminal 102 can be configured to acquire device capability from an image forming apparatus based on an instruction for performing printing being received from the user.

Furthermore, in the above-described first to third exemplary embodiments, in a case where PDF data generated by the client terminal 102 is PDF data including an object high in processing load in an image forming apparatus, the client terminal 102 performs format conversion. Then, in the above-described fourth exemplary embodiment, in a case where there is a possibility that an image forming apparatus performs predetermined alternative processing on PDF data generated by the client terminal 102, the client terminal 102 performs format conversion on the PDF data. A configuration in which, in a case where PDF data generated by the client terminal 102 is PDF data including an object high in processing load in an image forming apparatus or in a case where PDF data generated by the client terminal 102 is PDF data which may be subjected to predetermined alternative processing by an image forming apparatus, the client terminal 102 performs format conversion can be employed.

Embodiments of the present disclosure can also be implemented by performing the following processing. Specifically, the processing includes supplying software (a computer program) for implementing the functions of the above-described exemplary embodiments to a system or apparatus via a network or any type of storage medium and causing a computer (or, for example, a CPU or a micro processing unit (MPU)) to read out and execute the program. In this case, the present disclosure includes the computer program and a storage medium storing the computer program.

According to the above-described configurations, an image forming apparatus can receive data which, although being able to be processed by the image forming apparatus, has been converted into a format appropriate for processing to be performed in the image forming apparatus, depending on the content of the data.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-111848 filed Jun. 29, 2020 and No. 2021-020062 filed Feb. 10, 2021, which are hereby incorporated by reference herein in their entirety.

What is claimed is:

1. An information processing apparatus comprising:
one or more processors configured to perform operations comprising:
receiving information indicating a predetermined object from an image forming apparatus;
determining whether the object indicated by the information is included in image data for which a printing instruction has been issued by a user;
converting the image data into a predetermined format on a basis that it has been determined that the image data includes the object indicated by the information; and
transmitting the converted image data to the image forming apparatus.

2. The information processing apparatus according to claim 1, wherein the information indicating the object is information indicating an object high in processing load in the image forming apparatus.

3. The information processing apparatus according to claim 1, wherein, in a case that a number of the objects indicated by the information included in the image data is more than a predetermined number, the image data is converted into the predetermined format.

4. The information processing apparatus according to claim 1, wherein the one or more processors are further configured to perform operations comprising:
converting the image data into the predetermined format in a case that a number of objects included in one page of the image data is more than a predetermined number.

5. The information processing apparatus according to claim 1, wherein the one or more processors are further configured to perform operations comprising:
converting the image data to the predetermined format, in a case that a number of occurrences of overlapping of objects in one page of the image data is more than a predetermined number.

6. The information processing apparatus according to claim 1, wherein the one or more processors are further configured to perform operations comprising:
receiving a setting of the image forming apparatus; and
determining whether to convert the image data into the predetermined format based on the received setting.

7. The information processing apparatus according to claim 1, wherein the predetermined format is a raster format.

8. The information processing apparatus according to claim 7, wherein a data format of the image data is Portable Document Format (PDF).

9. The information processing apparatus according to claim 1, wherein the information to be received is information determined based on an interpretation method which the image forming apparatus uses to interpret the image data.

10. The information processing apparatus according to claim 1, wherein the information to be received is based on a renderer algorithm which the image forming apparatus uses to perform rendering of the image data.

11. The information processing apparatus according to claim 1, wherein the one or more processors are further configured to perform operations comprising:
searching for an image forming apparatus; and
receiving the information from an image forming apparatus detected by the searching.

12. An image forming apparatus comprising:
one or more processors configured to perform operations comprising:
receiving an acquisition request for capability information about the image forming apparatus from an information processing apparatus;
transmitting, to the information processing apparatus, information indicating an object to be converted into a predetermined format by the information processing apparatus, in response to the received acquisition request;
receiving print data including the object converted into the predetermined format from the information processing apparatus having received the information; and
performing processing for printing based on the received print data.

13. The image forming apparatus according to claim 12, wherein the capability information is information determined based on a renderer algorithm of the image forming apparatus.

14. A control method for an information processing apparatus, the control method comprising:
receiving information indicating a predetermined object from an image forming apparatus;
determining whether the object indicated by the information is included in image data for which a printing instruction has been issued by a user;
converting the image data into a predetermined format on a basis that it has been determined that the image data includes the object indicated by the information; and
transmitting the converted image data to the image forming apparatus.

15. A non-transitory computer-readable storage medium storing computer-executable instructions that, when executed by a computer, cause the computer to perform a control method for an information processing apparatus, the control method comprising:
receiving information indicating a predetermined object from an image forming apparatus;
determining whether the object indicated by the information is included in image data for which a printing instruction has been issued by a user;

converting the image data into a predetermined format on a basis that it has been determined that the image data includes the object indicated by the information; and transmitting the converted image data to the image forming apparatus.

* * * * *